US012659101B2

(12) United States Patent
Säily et al.

(10) Patent No.: US 12,659,101 B2
(45) Date of Patent: Jun. 16, 2026

(54) POSITIONING

(71) Applicant: Nokia Technologies Oy, Espoo (FI)

(72) Inventors: Mikko Säily, Espoo (FI); Risto Ilari Wichman, Helsinki (FI); Mehmet Cagri Ilter, Espoo (FI); Alexis Dowhuszko, Espoo (FI)

(73) Assignee: Nokia Technologies Oy, Espoo (FI)

( * ) Notice: Subject to any disclaimer, the term of this patent is extended or adjusted under 35 U.S.C. 154(b) by 262 days.

(21) Appl. No.: 18/480,965

(22) Filed: Oct. 4, 2023

(65) Prior Publication Data

US 2024/0154752 A1 May 9, 2024

(30) Foreign Application Priority Data

Nov. 4, 2022 (FI) ...................................... 20225997

(51) Int. Cl.
*H04L 5/00* (2006.01)
*H04W 64/00* (2009.01)
(52) U.S. Cl.
CPC ........... *H04L 5/0048* (2013.01); *H04W 64/00* (2013.01)
(58) Field of Classification Search
CPC ................ H04L 5/0048; H04L 5/0064; H04L 2027/0024; H04L 5/0041; H04L 5/0094; H04L 27/0014; H04L 5/0051; H04W 64/00; G01S 5/0205; G01S 5/0236
USPC ............. 455/456.1, 422, 440; 340/988, 996; 342/450
See application file for complete search history.

(56) References Cited

U.S. PATENT DOCUMENTS

| | | | |
|---|---|---|---|
| 9,037,155 B2 | 5/2015 | Fischer et al. | |
| 10,243,710 B2 | 3/2019 | Feinmesser et al. | |
| 10,681,668 B2 | 6/2020 | Haatsen | |
| 10,736,113 B2 | 8/2020 | Wang et al. | |
| 2017/0280294 A1* | 9/2017 | Sommer | H04W 4/023 |
| 2019/0165971 A1* | 5/2019 | Manolakos | H04L 25/0226 |

(Continued)

FOREIGN PATENT DOCUMENTS

| | | |
|---|---|---|
| EP | 2991441 A2 | 3/2016 |
| EP | 3316534 A1 | 5/2018 |

(Continued)

OTHER PUBLICATIONS

Extended European Search Report received for corresponding European Patent Application No. 23201602.2, dated Mar. 28, 2024, 10 pages.

(Continued)

*Primary Examiner* — Juan A Torres
(74) *Attorney, Agent, or Firm* — Barta Jones, PLLC

(57) ABSTRACT

An apparatus and method for position estimation are disclosed. The apparatus receives configuration information for a first Reference Signal (RS), and a second RS. The configuration information includes information indicative of a first and second time-frequency resource allocated to the first and second RS respectively. The allocation the resources is based on an estimate of a coherence time and a coherence bandwidth of a channel between the apparatus and a node. The apparatus receives the first and second RSs based on the configuration information and thereafter determines a phase offset between the received first and RSs. The first or second received RS are adjusted based on the phase offset and a third RS is generated for use in position estimation.

20 Claims, 8 Drawing Sheets

(56) References Cited

U.S. PATENT DOCUMENTS

| | | | |
|---|---|---|---|
| 2019/0253282 A1 | 8/2019 | Hadaschik et al. | |
| 2020/0021470 A1* | 1/2020 | Sun .......................... | H04L 25/02 |
| 2020/0178028 A1 | 6/2020 | Markhovsky et al. | |
| 2021/0091365 A1 | 3/2021 | Lin et al. | |
| 2022/0078050 A1 | 3/2022 | Marshall et al. | |
| 2022/0109466 A1 | 4/2022 | Manolakos et al. | |

FOREIGN PATENT DOCUMENTS

| | | | |
|---|---|---|---|
| WO | 2022/063258 A1 | 3/2022 | |
| WO | 2022/078664 A1 | 4/2022 | |
| WO | 2022/147379 A1 | 7/2022 | |
| WO | 2022/150226 A1 | 7/2022 | |
| WO | 2022/192823 A1 | 9/2022 | |
| WO | 2023/151884 A1 | 8/2023 | |

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 5 pages.

"3rd Generation Partnership Project; Technical Specification Group Services and System Aspects; Service requirements for the 5G system; Stage 1 (Release 18)", 3GPP TS 22.261, V18.6.0, Mar. 2022, 114 pages.

Huang et al., "Maximum likelihood TOA and OTDOA estimation with first arriving path detection for 3GPP LTE system", Transactions on Emerging Telecommunications Technologies, Nov. 3, 2014, 18 pages.

"3rd Generation Partnership Project; Technical Specification Group Radio Access Network; Study on support of reduced capability NR devices (Release 17)", 3GPP TR 38.875, V17.0.0, Mar. 2021, pp. 1-135.

"3rd Generation Partnership Project; Technical Specification Group Radio Access Network; NR; Physical layer measurements (Release 17)", 3GPP TS 38.215, V17.1.0, Mar. 2022, pp. 1-26.

Xu et al., "Carrier-Aggregated Timing Estimation for Radio Positioning", IEEE 89th Vehicular Technology Conference (VTC2019—Spring), Apr. 28-May 1, 2019, 7 pages.

"Discussion on Positioning with Multiple Frequency Layers (Carriers)", 3GPP TSG RAN WG1 #109-e, R1-2203629, Agenda: 9.5.4, ZTE, May 9-20, 2022, pp. 1-5.

Vasisht et al., "Decimeter-Level Localization with a Single WiFi Access Point", Proceedings of the 13th Usenix Conference on Networked Systems Design and Implementation, Mar. 16-18, 2016, pp. 165-178.

Jakes, "Microwave mobile communications", IEEE Press, 1974, 645 pages.

"Msc-generator", Sourceforge, Retrieved on Oct. 14, 2023, Webpage available at : https://sourceforge.net/projects/msc-generator/.

Pokrajac et al., "Direct position determination of wideband signals: Coherent and noncoherent approach", 11th International Conference on Telecommunications in Modern Satellite, Cable and Broadcasting Services (TELSIKS), Oct. 16-19, 2013, pp. 77-80.

Office action received for corresponding Finnish Patent Application No. 20225997, dated Mar. 29, 2023, 13 pages.

Papazaferopoulos et al., "Scalable Cell-Free Massive MIMO Systems: Impact of Hardware Impairments", IEEE Transactions on Vehicular Technology, vol. 70, No. 10, Oct. 2021, pp. 9701-9715.

* cited by examiner

300

Channel phase estimates

Empirical CDF

POSITIONING

RELATED APPLICATION

The present application claims priority from, and the benefit of, Finnish Application No. 20225997, filed Nov. 4, 2022, which is hereby included by reference in its entirety.

TECHNOLOGICAL FIELD

Examples of the disclosure relate to positioning. Some examples, though without prejudice to the foregoing, relate to Wide Bandwidth based positioning in 5th Generation, 5G, New Radio, NR.

BACKGROUND

A wireless network (e.g., a Next Generation Radio Access Network, NG-RAN) comprises a plurality of network nodes including: terminal nodes (e.g., User Equipment, UE) and access nodes (e.g., Transmission Reception Points, TRPs, such as gNodeBs, gNBs), wherein communication between the terminal nodes and access nodes is wireless. A position of a UE within a RAN can be determined by a Location Management Function, LMF, by various network-based positioning techniques, such as using LTE Positioning Protocol, LPP, or New Radio Positioning Protocol, NRPP.

A conventional framework for positioning in 5G NR (i.e., to determine the position of the UE—either via an Uplink, UL, positioning procedure or a Downlink, DL, positioning procedure) involves the transmission of: Sounding Reference Signals, SRS, transmitted by the UE for UL positioning; or Position Reference Signals, PRS, transmitted by TRPs/gNBs for DL positioning. Such Reference Signals, RSs, are received, detected and measured by the TRPs/gNBs (for UL positioning) or the UE (for DL positioning). The LMF, receives the measurements (such as: an estimate of a time of flight, a round trip time and/or an angle of departure/arrival of a signal) from the TRPs/gNBs or the UE and uses the measurements to compute the position of the UE.

In some situations, it can be desirable to improve positioning accuracy.

In some situations, it may be desirable to improve positioning accuracy for devices with reduced capabilities, such as for example a device whose receiver has a narrowband analogue/front RF end or RF chain (i.e. a receiver which is narrowband in its analogue domain). Narrowband signals occupy a narrow range of frequencies relative to the system bandwidth. In an example, a narrowband signal may occupy 5 MHz signal bandwidth, or less, compared to the example of wideband system bandwidth of 100 MHz. In another example, a wideband signal or composite wideband may refer to a composite wideband signal, constructed simply by aggregating plural narrowband signals multiple of narrowband signal instances, thus aggregated wideband signal may be less than the system bandwidth but wider than one or more narrowband signals.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any examples and features described in this specification that do not fall under the scope of the independent claims are to be interpreted as examples useful for understanding various embodiments of the invention.

According to at least some examples of the disclosure there is provided an apparatus comprising:

means for receiving configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

means for receiving, based at least in part on the configuration information, the first and second RSs;

means for determining a phase offset between the received first RS and the received second RS;

means for adjusting one of the first and second received RSs based, at least in part, on the phase offset;

means for generating a third RS for use in position estimation, wherein the third RS is generated based, at least in part, on:

one of the first and second RSs, and an adjusted other of the first and second RSs.

According to various, but not necessarily all, examples of the disclosure there is provided a method comprising:

receiving configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receiving, based at least in part on the configuration information, the first and second RSs;

determining a phase offset between the received first RS and the received second RS;

adjusting one of the first and second received RSs based, at least in part, on the phase offset;

generating a third RS for use in position estimation, wherein the third RS is generated based, at least in part, on:

one of the first and second RSs, and an adjusted other of the first and second RSs.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

receiving configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receiving, based at least in part on the configuration information, the first and second RSs;

determining a phase offset between the received first RS and the received second RS;

adjusting one of the first and second received RSs based, at least in part, on the phase offset;

generating a third RS for use in position estimation, wherein the third RS is generated based, at least in part, on:

one of the first and second RSs, and an adjusted other of the first and second RSs.

According to various, but not necessarily all, examples of the disclosure there is provided an apparatus comprising:

at least one processor; and at least one memory storing instructions that, when executed by the at least one processor, cause the apparatus at least to:

receive configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receive, based at least in part on the configuration information, the first and second RSs;

determine a phase offset between the received first RS and the received second RS;

adjust one of the first and second received RSs based, at least in part, on the phase offset;

generate a third RS for use in position estimation, wherein the third RS is generated based, at least in part, on:

one of the first and second RSs, and an adjusted other of the first and second RSs.

According to various, but not necessarily all, examples of the disclosure there is provided a non-transitory computer readable medium encoded with instructions that, when executed by at least one processor, causes at least the following to be performed:

receive configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receive, based at least in part on the configuration information, the first and second RSs;

determine a phase offset between the received first RS and the received second RS;

adjust one of the first and second received RSs based, at least in part, on the phase offset;

generate a third RS for use in position estimation, wherein the third RS is generated based, at least in part, on:

one of the first and second RSs, and an adjusted other of the first and second RSs.

According to at least some examples of the disclosure there is provided an apparatus comprising:

means for sending configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

means for sending, based at least in part on the configuration information, the first and second RSs.

According to various, but not necessarily all, examples of the disclosure there is provided a method comprising:

sending configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

sending, based at least in part on the configuration information, the first and second RSs.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

send configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

sending, based at least in part on the configuration information, the first and second RSs.

According to various, but not necessarily all, examples of the disclosure there is provided an apparatus comprising:

at least one processor; and at least one memory storing instructions that, when executed by the at least one processor, cause the apparatus at least to:

send configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

send, based at least in part on the configuration information, the first and second RSs.

According to various, but not necessarily all, examples of the disclosure there is provided a non-transitory computer readable medium encoded with instructions that, when executed by at least one processor, causes at least the following to be performed:

send configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

send, based at least in part on the configuration information, the first and second RSs.

According to at least some examples of the disclosure there is provided an apparatus comprising:

means for receiving a first Reference Signal, RS, wherein the received first RS comprises, in the frequency domain, a plurality of signal components associated with a respective plurality of frequencies;

means for receiving a second RS, wherein the received second RS comprises, in the frequency domain, a plurality of signal components associated with a respective plurality of frequencies;

means for selecting a first signal component of the first RS and a second signal component of the second RS whose respective associated frequencies are separated by less than or equal to the estimated channel coherence bandwidth;

means for determining a first phase value for the first signal component;

means for determining a second phase value for the second signal component; and means for determining a phase offset based, at least in part, on a difference between the first and second phase values.

According to various, but not necessarily all, examples of the disclosure there is provided a method comprising:

receiving a first Reference Signal, RS, wherein the received first RS comprises, in the frequency domain, a plurality of signal components associated with a respective plurality of frequencies;

receiving a second RS, wherein the received second RS comprises, in the frequency domain, a plurality of signal components associated with a respective plurality of frequencies;

selecting a first signal component of the first RS and a second signal component of the second RS whose respective associated frequencies are separated by less than or equal to the estimated channel coherence bandwidth;

determining a first phase value for the first signal component;

determining a second phase value for the second signal component; and determining a phase offset based, at least in part, on a difference between the first and second phase values.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

receiving a first Reference Signal, RS, wherein the received first RS comprises, in the frequency domain, a plurality of signal components associated with a respective plurality of frequencies;

receiving a second RS, wherein the received second RS comprises, in the frequency domain, a plurality of signal components associated with a respective plurality of frequencies;

selecting a first signal component of the first RS and a second signal component of the second RS whose respective associated frequencies are separated by less than or equal to the estimated channel coherence bandwidth;

determining a first phase value for the first signal component;

determining a second phase value for the second signal component; and determining a phase offset based, at least in part, on a difference between the first and second phase values.

According to various, but not necessarily all, examples of the disclosure there is provided an apparatus comprising:

at least one processor; and at least one memory storing instructions that, when executed by the at least one processor, cause the apparatus at least to:

receive a first Reference Signal, RS, wherein the received first RS comprises, in the frequency domain, a plurality of signal components associated with a respective plurality of frequencies;

receive a second RS, wherein the received second RS comprises, in the frequency domain, a plurality of signal components associated with a respective plurality of frequencies;

select a first signal component of the first RS and a second signal component of the second RS whose respective associated frequencies are separated by less than or equal to the estimated channel coherence bandwidth;

determine a first phase value for the first signal component;

determine a second phase value for the second signal component; and determine a phase offset based, at least in part, on a difference between the first and second phase values.

According to various, but not necessarily all, examples of the disclosure there is provided a non-transitory computer readable medium encoded with instructions that, when executed by at least one processor, causes at least the following to be performed:

receiving a first Reference Signal, RS, wherein the received first RS comprises, in the frequency domain, a plurality of signal components associated with a respective plurality of frequencies;

receiving a second RS, wherein the received second RS comprises, in the frequency domain, a plurality of signal components associated with a respective plurality of frequencies;

selecting a first signal component of the first RS and a second signal component of the second RS whose respective associated frequencies are separated by less than or equal to the estimated channel coherence bandwidth;

determining a first phase value for the first signal component;

determining a second phase value for the second signal component; and determining a phase offset based, at least in part, on a difference between the first and second phase values.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, a separation distance, in the time domain, between the first time-frequency resource and the second time-frequency resource is less than or equal to the estimated channel coherence time.

In some but not necessarily all examples, coherence time can be understood to be the time duration over which the channel impulse response represents the channel and can be considered not varying, for example due to Doppler effects. Coherence bandwidth or frequency indicates a range of frequencies over which the channel can be considered flat.

Coherence bandwidth or frequency indicates the bandwidth or frequency where frequencies of narrowband signals are likely to experience comparable or correlated fading.

In some but not necessarily all examples, the configuration information configures the apparatus to receive the first and second RSs within a period of time that is less than or equal to the estimated channel coherence time.

In some but not necessarily all examples a separation distance, in the frequency domain, between:

a frequency within one of the first and second time-frequency resources, and a frequency within the other of the first and second time-frequency resources is less than or equal to the estimated channel coherence bandwidth.

In some but not necessarily all examples, the configuration information configures the apparatus to receive the first and second RSs over respective first and second frequency ranges, and an upper end of one of the frequency ranges and a lower end of the other of the frequency ranges are within a frequency bandwidth that is less than or equal to the estimated channel coherence bandwidth.

In some but not necessarily all examples, wherein the received first RS comprises, in the frequency domain, a plurality of signal components associated with a respective plurality of frequencies;

the received second RS comprises, in the frequency domain, a plurality of signal components associated with a respective plurality of frequencies; and the means for determining a phase offset comprises means for:

selecting a first signal component of the first RS and a second signal component of the second RS whose respective associated frequencies are separated by less than or equal to the estimated channel coherence bandwidth;

determining a first phase value for the first signal component;

determining a second phase value for the second signal component; and defining the phase offset based, at least in part, on a difference between the first and second phase values.

In some but not necessarily all examples, the apparatus further comprises:

means for determining a difference in a time of reception the first RS and a time of reception of the second RS; and means for determining a phase shift between the received first RS and the received second RS based, at least in part, on the difference in the time of reception the first RS and a time of reception of the second RS.

In some but not necessarily all examples, the means for adjusting one of the first and second received RSs further comprises:

means for adjusting one of the first and second received RSs based, at least in part, on the phase shift.

In some but not necessarily all examples, the apparatus further comprises at least one selected from the group of:

means for estimating the channel coherence time and/or bandwidth;

means for sending information indicative of the estimated channel coherence time and/or bandwidth to another device; and means for sending, to another device, information for enabling the another device to estimate the channel coherence time and/or bandwidth.

In some but not necessarily all examples, there is provided a device comprising the apparatus of any of previous claim, wherein the device is at least one selected from the group of: a portable device, a handheld device, a wearable device, a wireless communications device, a User Equipment, a positioning tag, or a server.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION OF THE DRAWINGS

Some examples will now be described with reference to the accompanying drawings in which.

Figure 1:
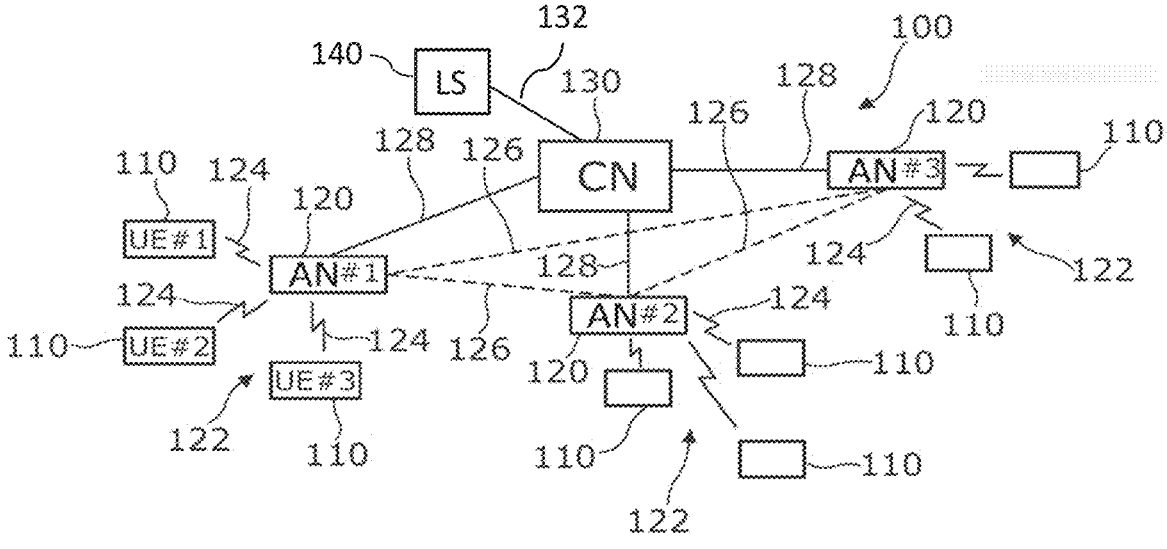
FIG. 1 shows an example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

DETAILED DESCRIPTION

FIG. 1 schematically illustrates an example of a network 100 comprising a plurality of network nodes including terminal nodes 110 (also referred to as User Equipment, UE), access nodes 120 (also referred to as Transmission Reception Points, TRPs), one or more core nodes 130 and one or more location servers 140. The terminal nodes 110 and access nodes 120 communicate with each other. The access nodes 120 may communicate with the location server 140 via the one or more core nodes 130. The access nodes 120 and one or more location servers 140 may communicate directly with each other. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for fifth generation, 5G, technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces). The interfaces between the one or more location servers 140 and the one or more core nodes 130 are backhaul interfaces 132 (e.g., NLs interface).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to an AMF (Access and Mobility Management Function) by means of an NG control plane (NG-C) interface and to the UPF (User Plane Function) by means of an NG user plane (NG-U) interface. The access nodes 120 may be interconnected with each other by means of Xn interfaces 126.

The cellular network 100 could be configured to operate in licensed frequency bands, referred to herein as NR spectra, or unlicensed frequency bands, referred to herein as NR-U spectra (not least such as: unlicensed bands that rely upon a transmitting device to sense the radio resources/medium before commencing transmission, such as via a Listen Before Talk (LBT) procedure; and a 60 GHz unlicensed band where beamforming may be required in order to achieve required coverage).

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a Subscriber Identity Module (SIM). In other examples, the term 'User Equipment' is used to designate a location/position tag, a hyper/smart tag or a mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a Transmission Reception Points (TRPs) or base stations. The access nodes 120 are the network termination of a radio link. An access node 120 can be implemented as a single network equipment, or have a split architecture that is disaggregated/distributed over two or more RAN nodes, such as a Central Unit (CU), a Distributed Unit (DU), a Remote Radio Headend (RRH), using different functional-split architectures and different interfaces.

Where the access node 120 has a disaggregated (split) architecture, the access node 120 can comprise one or more distributed units (gNB-DU) and a centralized unit (gNB-CU)—not shown in FIG. 1. The gNB-CU is a logical node configured to host a Radio Resource Connection (RRC) layer and other layers of the access node 120. The gNB-CU controls the operation of one or more gNB-DUs. The gNB-DU is a logical node configured to host Radio Link Control (RLC) protocol layer, Medium Access Control (MAC) layer and Physical (PHY) layer of the access node 120. The gNB-DU communicates via a dedicated interface (F1) to the RRC layer hosted by the gNB-CU. One gNB-DU can support one or multiple cells 122, whereas one cell is supported by only one gNB-DU.

The location server 140 is a device that manages the support of different location services for UEs, including positioning of UEs and delivery of assistance data to UEs. The location server can be connected to the core node and the Internet. The location server can be implemented as one or more servers. The location server is configured to support one or more location services for UEs 110 that can connect to the location server 140 via the core network 130 and/or via the Internet. The location server may be referred to as Location Management Function (LMF). Where the location server resides in a RAN node, it may be referred to as a Location Management Component (LMC). The location server may interact with a serving RAN node for a UE in order to obtain position measurements for the UE, including uplink measurements made by a RAN node and downlink measurements made by the UE.

In the following description, a location server 140 will be referred to as an LMF 140, an access node 120 will be referred to as a gNB 120 and a terminal node 110 will be referred to as a UE 110.

The position of a UE within a RAN can be determined by an LMF by various network-based positioning techniques (such as using LTE Positioning Protocol, LPP, or New Radio Positioning Protocol, NRPP). Conventional techniques involve the exchange, over a Uu interface in the NR spectra, of RSs (e.g., transmitting OFDM-PRSs from RAN nodes to a UE for DL positioning; and transmitting OFDM-SRSs from a UE to RAN nodes for UL positioning). Such Reference Signals, RSs, are received, detected and measured by the gNBs (for UL positioning) or the UE (for DL positioning). The LMF, receives the measurements from the gNBs or the UE. Such measurement information is received by the LMF via an Access and Mobility Management Function, AMF, over a backhaul interface (e.g., NLs interface). The LMF then uses such received measurement information to compute the position of the UE. A NR Positioning Protocol A, NRPPa, carries positioning information between the NG-RAN nodes and the LMF over a NG control plane interface (e.g., NG-C interface).

Such Radio Access Technology, RAT, based positioning techniques may utilise one of the following methods: Uplink Angle of Arrival (UL-AoA), Downlink Angle of Departure (DL-AoD), Variance of Time of Arrival (TOA)-based ranging, Uplink Time Difference of Arrival (UL-TDOA), Downlink Time Difference of Arrival (DL-TDOA), and Multi-cell Round Trip Time (Multi-RTT).

The 5G NR localization process is standardized in the 5G NR LPP specification. A conventional positioning session relies on a receiver measuring positioning RSs (PRS in DL, and SRS in UL) which are scheduled by the network on specific time-frequency-space-code resources. The allocation of resources for such transmissions is coordinated across multiple UEs and gNBs via LPP and NRPPa interfaces, so that the RSs are ensured to be unique and interference free. This is done to enable the receiver (UE in DL and gNB in UL) to determine/compute/extract accurate positioning measurements which are reported back to the network (in case of UE-assisted positioning) or used locally (for UE-based positioning) to compute the UE location.

Positioning may typically be based on estimating the flight time of a signal from a transmitter to a receiver, round-trip time of a signal between a UE and network nodes, and/or the angle or departure/arrival of a signal. Cramer-Rao bound (CRB) of Time-of-arrival (TOA) estimates have been shown to be proportional to the inverse of the signal bandwidth squared. CRB itself characterizes a lower bound of the mean-square error (MSE) of any unbiased TOA estimator and consequently the accuracy of the positioning.

In positioning methods based on time-of-arrival of a received signal, the receiver correlates the received signal with a known sequence, e.g. PRS. A maximum peak of a cross correlation denotes a TOA of the signal. The higher the bandwidth, the better the resolution, and the more accurate the estimate of the peak location and hence the more accurate the positioning estimate as well. Therefore, for accurate positioning it is advantageous to use wideband signals (e.g. having a bandwidth of 100 MHz or more dependent on the desired positioning accuracy), rather than narrowband signals (e.g. having a bandwidth of 50 MHz or less, such as 5 MHz).

A typical receiver may be considered to comprise: an analog receiver (that corresponds to an analogue domain of the receiver), and a digital receiver (that corresponds to a digital domain of the receiver, such as its digital signal processor). The analog receiver may comprise: an antenna, an amplifier, one or more frequency converters/down converters, and one or more filters. The analog receiver may correspond to the front end of the receiver, i.e. the parts of receiver from antenna to the digital receiver. The analog receiver may be referred to as RF receiver or RF chain. The digital receiver may comprise an analog to digital converter (ADC). The digital receiver may correspond to the back end of the receiver that performs processing that is required to be done in real-time. The digital receiver may be referred to as a digital baseband.

Conventionally, in order to perform wideband positioning and use wideband signals, a wideband UE/wideband receiver is required wherein both the analog domain of the receiver as well as the digital domain of the receiver need to be capable of receiving and processing wideband signals. In other words, the receiver needs to have both:

a) a wideband analogue receiver/front end (i.e. a wideband RF receiver/RF chain) and b) a wideband digital receiver/back end (i.e. a wideband digital baseband).

However, some UE have reduced capabilities. Such UE devices with reduced capabilities may be referred to as "RedCap" devices. For instance, a receiver of a UE may have a wideband digital baseband but narrowband RF analogue front end.

In some situations, e.g. not least for such RedCap devices, it would be useful to be able to combine plural narrowband signals into one wideband signal in the baseband so as to thereby improve a positioning estimate. However, there would be a phase offset between each of the received narrowband signals which would be random/non-deterministic. Such a phase offset is due to an oscillator in the receiver tuning to different centre frequencies to receive each of the plural narrowband signals. Accordingly, a composite wideband signal, constructed simply by aggregating plural narrowband signals (each with a random phase offset) would be different from a real/non-composite wideband signal. If such a composite wideband signal were used for positioning, the accuracy of the position estimate would be inferior as compared to if a real/non-composite wideband signal were used. It is noted that a similar phenomenon happens with carrier aggregation if composite carriers are received using separate receivers.

In view of the above, it is conventionally believed that, when receiving plural narrowband signals separately on different frequencies, they cannot be coherently combined for wideband position estimation. Incoherent combining of narrowband signals and determining TOA estimates from different frequency bands would provide diversity gain only, and would not improve resolution in time (and hence position accuracy).

Therefore, conventionally, in order to improve positioning accuracy and combine narrowband signals coherently, it is necessary to receive the narrowband signals with a single wideband receiver (i.e. with a wideband analogue front RF end/RF chain).

However, contrary to the conventional general belief, the inventors of the present disclosure have devised a method to combine narrowband signals coherently into a wideband signal, even when the narrowband signals are separately received with a narrowband receiver such that the received narrowband signals have random phase offsets.

Various examples of the present disclosure may improve positioning accuracy, not least for example in use cases where UE has a wideband digital baseband but a narrowband RF chain. This may be achieved by composing a wideband signal from plural narrowband signals by combining two or more narrowband signals coherently—despite their random phase offsets. Random phase offset occurs, e.g., when a narrowband receiver tunes to a new centre frequency to measure different frequency bands such as for receiving each narrowband signal. For example, combining two 50 MHz narrowband signals coherently to a 100 MHz wideband signal may reduce a mean TOA estimation error by a factor of four as compared to using two incoherent narrowband signals.

The accuracy of the positioning can be improved by removing the effect of random phase offset between received narrowband signals before combining the received narrowband signals to one wideband signal. As will be discussed below, examples of disclosure provide a method of configuring the transmission of narrowband signals so that phase offsets between the received narrowband signals can be determined and compensated for following which the narrowband signals can be combined into a wideband signal and a wideband positioning procedure can then be performed on the composite wideband signal.

Figure 2:
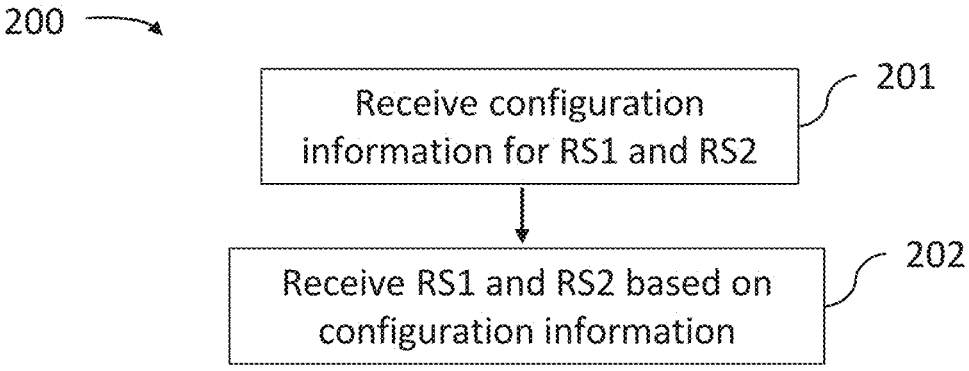
FIG. 2 shows another example of the subject matter described herein.

FIG. 2 schematically illustrates a flow chart of an example of a method 200 according to an example of the present disclosure. One or more of the features discussed in relation to FIG. 2 can be found in one or more of the other FIGs. During discussion of FIG. 2, reference will be made to other FIGS. for the purposes of explanation.

The component blocks of FIG. 2 are functional and the functions described can be performed by a single physical entity. Such a physical entity may correspond to an apparatus 10 as described with reference to FIG. 10. Such an apparatus may be implemented as a RAN node, not least for example such as a UE 110. The apparatus may have a receiver for receiving narrowband RSs, such as positioning RSs. The apparatus may have a narrowband analogue RF front end and a wideband digital baseband. The functions described in FIG. 2 can also be implemented by a computer program (such as is described with reference to FIG. 11).

In block 201, configuration information is received by the apparatus. The configuration information is configured to configure the apparatus to receive a first Reference Signal, RS, and a second RS. The configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, (e.g. the RAN node that is to transmit the first and second RSs) and an estimate of a coherence bandwidth of the channel.

The resources may be allocated such that a separation distance, in the time domain, between the first time-frequency resource and the second time-frequency resource is less than or equal to the estimated channel coherence time. In this regard, the configuration information may configure the apparatus to receive the first and second RSs within a period of time that is less than or equal to the estimated channel coherence time.

The resources may be allocated such that a separation distance, in the frequency domain, between:

a frequency (e.g. an end frequency of RS1) within one of the first and second time-frequency resources, and a frequency (e.g. a start frequency of RS2) within the other of the first and second time-frequency resources is less than or equal to the estimated channel coherence bandwidth. In this regard, the configuration configures the apparatus to receive the first and second RSs over respective first and second frequency ranges, wherein an upper end of one of the frequency ranges and a lower end of the other of the frequency ranges are within a frequency bandwidth that is less than or equal to the estimated channel coherence bandwidth.

As will be discussed further below, such an allocation of resources for the transmission/reception of the first and second RSs enables certain assumptions to be made regarding the reception of the first and second RSs which enables a determination of a phase offset between the first and second RSs to be made.

The reference signals may be one or more of the group of:

a downlink, DL, RS;

an uplink, UL, RS;

a pilot signal;

a signal indicative of a constant modulus pilot sequence;

an RS configured for use in determining a position of a User Equipment, UE;

a narrowband RS;

a Positioning RS, PRS;

a DeModulation Reference Signal, DMRS; and a Sounding Reference Signal, SRS.

In block 202, the apparatus receives the first and second RSs based at least in part on the configuration information.

As will be discussed below, the two received RSs can be narrowband PRSs which can be coherently combined (having duly adjusted/corrected the received RSs not least to compensate for their differing phase offset) into a composite wideband PRS whereupon the composite wideband PRS can be processed via the first apparatus' wideband digital baseband to perform wideband positioning measurements for positioning the first apparatus. In this regard, the first RS has a first bandwidth, the second RS has a second bandwidth, and the composite RS (a third RS for use in position estimation which is formed by coherently combining the first and second RSs) has a third bandwidth greater than each of the first and second bandwidths.

In this regard, one may consider that, in certain examples of the disclosure, a wideband PRS is effectively partitioned into narrowband PRSs, namely PRS1 and PRS2. One may consider that PRS1 is effectively transmitted over a first narrowband channel (defined at least in part by the allocation of the first time-frequency resource for PRS1 as indicated in the configuration information), and PRS2 is transmitted over a second narrowband channel (defined at least in part by the allocation of the second time-frequency resource for PRS2 as indicated in the configuration information). One may thereby consider that a composite wideband PRS (formed of first and second narrowband PRSs) is effectively transmitted over a composite wideband channel (formed of first and second narrowband channels). However, during the reception of the first and second PRSs by a receiver having a narrowband RF/analogue domain, a random phase offset occurs when the narrowband receiver tunes to a new centre frequency to measure different frequency bands for the first and second narrowband channels. By determining a phase offset between the first and second narrowband channels, the received PRS2 can be adjusted to compensate for the phase offset. The received composite wideband PRS is then determined based at least in part on the received PRS1 and the adjusted received PRS2. Such a received composite wideband PRS is then used in position estimation, e.g. by correlating it against the initial wideband PRS.

In the examples discussed above, only two reference signals are considered/shown: RS1 and RS2. However, it is to be appreciated that the methodology of the present disclosure can be extended to the use of more than two reference signals. For instance, if a third RS, RS3, is to be used, resources may be allocated such that a separation distance, in the time domain, between each of the three time-frequency resources for the three RSs is less than or equal to the estimated channel coherence time (i.e. so that all three RSs are received within a period of time that is less than or equal to the estimated channel coherence time). Likewise, the resources may be allocated such that (where the frequency range covered by RS3 is greater than that of RS2) a separation distance, in the frequency domain, between:

an end frequency of RS2, and a start frequency of RS3 is less than or equal to the estimated channel coherence bandwidth.

Figure 3:
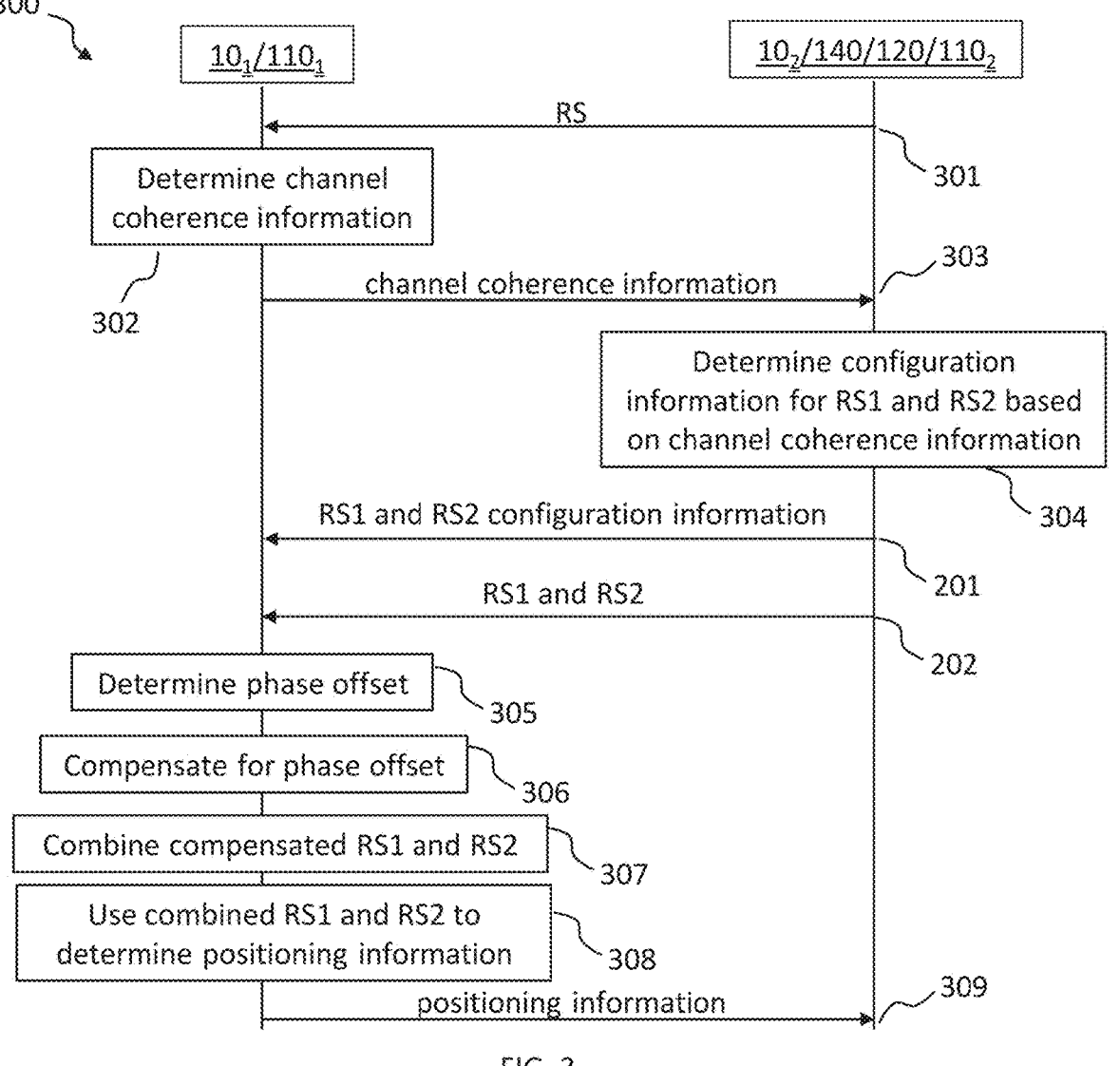
FIG. 3 shows another example of the subject matter described herein.

FIG. 3 is a signalling diagram illustrating signaling 300 between: a first apparatus $10_1$ and a second apparatus $10_2$. FIG. 3 can be considered to illustrate a plurality of methods. For instance, FIG. 3 illustrates one or more actions by/at a plurality of actors/entities (e.g., first and second apparatuses). In some examples, FIG. 3 can be considered to illustrate a plurality of individual methods performed by each respective individual actor/entity of the plurality of the actors/entities.

Figure 10:
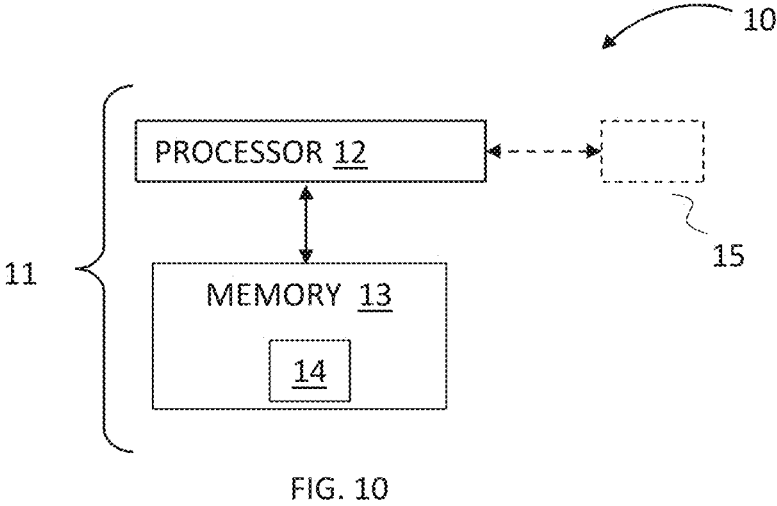
FIG. 10 shows another example of the subject matter described herein.

In some examples, the first apparatus may be an apparatus such as apparatus 10 of FIG. 10 or a UE 110 of FIG. 1. In some examples, the second apparatus may be an apparatus such as 10 of FIG. 10 or a RAN node as illustrated in FIG. 1. In some examples, the seconds apparatus may be a LMF 140, a gNB 120, a TRT or even another UE 110 (not least for example where a positioning procedure is performed over SideLink, SL). In some examples, the second apparatus may be a UE-type node such as a positioning reference unit, road side positioning unit.

At 301, the second apparatus sends a reference signal, RS, to the first apparatus. The reference signal may be any suitable reference signal for enabling the first apparatus to determine coherence information for a channel between the first and second apparatus. The channel coherence information may be indicative of:

an estimate of a channel coherence time, an estimate of a channel coherence frequency, and an estimate of a channel coherence bandwidth.

The reference signal may be, for example, a PRS, or a DeModulation Reference Signal, DMRS. The reference signal may be a narrow band signal.

At 302, the first apparatus determines channel coherence information (i.e. estimates of the channel coherence time, frequency and/or bandwidth) based, at least in part, on the RS received in block 301.

At 303, the first apparatus sends the channel coherence information to the second apparatus. In some examples, the channel coherence information comprises the estimates of the channel coherence time, frequency and/or bandwidth. In other examples, the channel coherence information comprises information for enabling the second apparatus to determine the estimates of the channel coherence time, frequency and/or bandwidth. For instance, instead of the channel coherence information comprising an estimate of the channel coherence time, it may comprise and indication of a Doppler shift associated with movement of the first apparatus relative to the second apparatus.

At 304, the second apparatus determines configuration information for configuring the first apparatus to receive plural reference signals. The determination of the configuration information may be based, at least in part, on the received channel coherence information.

The configuration information may comprise information indicative of:

a first time-frequency resource allocated to the first RS, and a second time-frequency resource allocated to the second RS.

The allocation of at least one of the first or second time-frequency resources may be based, at least in part, on the channel coherence information. In this regard, the time domain characteristics of the time-frequency resource are allocated based at least in part on the estimate of the channel coherence time, and the frequency domain characteristics of the time-frequency resource are allocated based at least in part on the estimate of the channel coherence bandwidth and/or the estimate of a channel coherence frequency, such as discussed above with regards to FIG. 2.

The provision of channel coherence information to the second device/network allows the network to allocate the resources for RS1 and RS2 from non-adjacent resource pools in more efficient way. For instance, if the first apparatus/UE were stationary or slowly moving, then the channel coherence information may indicate that more distant RS resources in the frequency domain could work (i.e. still be within the channel coherence bandwidth and/or channel coherence frequency). This may thereby allow more flexibility/freedom in the allocation of resources and the aggregation of the RSs. The faster the first apparatus/UE is moving UE, the smaller frequency gap between resources for the RSs (due to the limited coherence of the channel under such circumstances). Where the resources allocated for the RSs are adjacent, then the coherence information may not be needed.

In the example of FIG. 3, the second apparatus receives channel coherence information (i.e. estimates of the channel coherence frequency and bandwidth) and allocates resources for the first and second RSs based at least in part on the same. However, in other examples, it is not essential for the second apparatus to receive such channel coherence information. If the second apparatus is not provided with such information, it could nevertheless make a decision concerning the allocation of resources and the configuration of the configuration information by making an assumption as to estimates of the channel coherence time and bandwidth, for instance use pre-defined or pre-determined values of the same. In this regard, the second apparatus may, in effect, determine the resource allocation and configuration information "blindly". It being appreciated that, in the worst case where the resources for RS1 and RS2 are so far apart (in each of the time and frequency domains) such that the below described phase compensation method does not work, the UE would not be able to utilize a full aggregated (wideband) RS bandwidth but instead would be able to continue merely with each (narrowband) RS and merely taking advantage of a diversity gain provided by the use of two RSs (rather than being able to take advantage of an improved resolution and increased positioning accuracy that could be obtained were an aggregated wideband RS able to be used.

At 201 (and as per 201 of FIG. 2), the configuration information is sent from the second apparatus to the first apparatus.

At 202 (and as per 202 of FIG. 2), each of RS1 and RS2 is sent to the first apparatus from the second apparatus. The first apparatus uses the received configuration information (And allocated resources) to receive RS1 and RS2.

At 305, a phase offset between the received RS1 and RS2 is determined. This phase offset may be due to an oscillator in the first apparatus' receiver tuning to different centre frequencies during the reception of RS1 and RS2.

The following is an example of a method for determining the phase offset between received signals RS1 RS2, referred to as Y1 and Y2, that are received by the first apparatus. The determination of the phase offset can be used to enable a coherent combination of the two separate received signals. In this example, the received signals RS1 RS2 are narrowband RSs. In this example, the received signals RS1 RS2 are PRSs (i.e. PRS1 and PRS2), but which in other examples may be DMRS or other constant modulus pilot sequences).

Let us consider the two narrowband received signals in frequency domain:

$$Y1=(Y1[0], \ldots Y1[N-1])$$

$$Y2=(Y2[0], \ldots Y2[N-1])$$

Each signal has N subcarriers and the frequency of Y2[0] is higher than Y1 [N−1].

Due to the allocation of resources for Y1 and Y2, a difference between:

the time of receipt of Y1 and the time of receipt of Y2 is less than or equal to the estimated channel coherence time.

Due to the allocation of resources for Y1 and Y2, a difference between:

the frequency of Y1's subcarrier [N−1] and the frequency of Y2's subcarrier [0]

is less than or equal to the estimated channel coherence bandwidth.

The signals Y1 and Y2 may also overlap in frequency, but then the total bandwidth of a composite signal formed of an aggregation of (overlapping) Y1 and Y2 would be smaller than in the case without overlap. In order to maximize the performance/accuracy of the positioning, the total bandwidth of the composure signal should be maximized. Hence it is preferably to reduce/avoid Y1 and Y2 overlapping in frequency, whilst keeping the frequency separation between the end of Y1 and the start of Y2 to be less than or equal to the estimated channel coherence bandwidth.

The composite signal in frequency domain is given by:

$$Y=(Y1,Y2)$$

The sampling frequency to represent Y is at least two times higher than that of Y1 and Y2.

Let us consider two narrowband transmitted signals, referred to as X1 and X2 (i.e. the transmission of X1 is received as Y1, and the transmission of X2 is received as Y2). X1 and X2 may be known PRS, DMRS or other constant modulus pilot sequences.

Signals X1 and X2 are transmitted from the same antenna port of the transmitter (e.g. a transmitter of the second apparatus such as a serving gNB) such that they pass through the same channel but at different frequencies.

In frequency domain:

$$Y1=H1X1=(H1[0]X1[0], \ldots ,H1[N{-}1]X1[N{-}1]) \text{ and}$$

$$Y2=H2X2=(H2[N]X2[0], \ldots ,H2[2N{-}1]X2[N{-}1]) \\ *\exp(jp)$$

The random phase offset in Y2 is denoted by $\varphi$. The frequency response of a multipath fading channel is denoted by H1 and H2. H1 and H2 may be determined based on channel estimation, i.e. performing a channel estimation process on the channel over which the reference signal is transmitted/received.

As discussed above, resources may be allocated such that a separation distance, in the frequency domain, between Y1[N−1] and Y2[0] is less than or equal to an estimated channel coherence bandwidth. In this example, it is assumed that Y2[0] are Y1[N−1] are adjacent subcarriers. In general, it is possible to have a frequency gap between Y1 and Y2 (and non-adjacent subcarriers) although in this example there is no such gap. Where there is a frequency gap it is less than or equal to the estimated channel coherence bandwidth Let us assume that:

$$D(\arg(H1[N{-}1])){\sim}D(\arg(H2[N]))$$

where: arg( ) refers to an angle (i.e. a phase angle of a signal component for a given subcarrier), and D( ) is a difference operator.

Due to the random phase offset $\varphi$:

$$Y1[N{-}1]/X1[N{-}1]=H1[N{-}1] \text{ and}$$

$$Y2[0]/X2[0]=H2[N]*\exp(jp)$$

Therefore, there is a discontinuity in the channel phase estimates which may lead to a shift of the largest peak when correlating a composite wideband signal (formed by aggregating Y1 and Y2) with a wideband RS (namely formed by aggregating X1 and X2).

The assumption that D(arg(H1 [N−1]))~D(arg(H2[N])) [which is able to be assumed due to the manner in which resources for Y1 and Y2 were allocated] means that, without the random phase offset, the phase response of the composite wideband signal would be approximately continuous. This in turn implies that the largest frequency in Y1 and the smallest frequency in Y2 are within the channel coherence bandwidth. This then enables p to be estimated by matching the first numerical derivatives within Y1 and/or Y2 and across the phase discontinuity, for example:

$$\arg(Y1[N{-}1]/X1[N{-}1]){-}\arg(Y1[N{-}2]/X1[N{-}2]){+}\hat{\phi}{=}\arg \\ (Y2[0]/X2[0]){-}\arg(Y1[N{-}1]/X1[N{-}1])$$

where refers to an estimate of the phase offset.

In other words, $\hat{\phi}$=[[arg(Y2[0]/X2[0])]−[arg(Y1 [N−1]/ X1 [N−1])]]−[[arg(Y1 [N−1]/X1 [N−1])]-[arg(Y1 [N−2]/X1 [N−2])]]

In this regard the phase offset may be determined based, at least in part, the following: a first phase value for a first signal component of the received first RS, namely:

$$\arg(Y1[N{-}1])$$

a further first phase value for a signal component of the first RS that is adjacent, in the frequency domain, to the first signal component of the first RS, namely:

$$\arg(Y1[N{-}2])$$

a first phase value difference, wherein the first phase value difference is a difference between the first phase value and the further first phase value, namely $$\arg(Y1[N{-}1]){\sim}\arg(Y1[N{-}2])$$

a second phase value for a second signal component of the received second RS (wherein the frequency associated with the second signal component is separated from the frequency associated with the first signal component by less than or equal to the estimated channel coherence bandwidth), namely:

$$\arg(Y2[0])$$

a difference between the first and second phase values, namely:

$$\arg(Y2[0]){\sim}\arg(Y1[N{-}1])$$

Each of the above differences may be normalized. Normalizing in this regard means that the difference is divided by the frequency range in which the difference is calculated. In this regard, one or more of the following may be normalised:

the first phase value difference;
the difference between the first and second phase values.

The phase offset may be determined based, at least in part, on a difference between:

the normalized first phase value difference, and
the normalized difference between the first and second phase values.

The estimated phase offset $\hat{\phi}$ is then subtracted from Y2 to create an adjusted Y'2 that has been modified to as to compensate for the phase offset, i.e.:

$$Y'2=Y2{-}\hat{\phi}=(Y2[0]{-}\hat{\phi},Y2[1]{-}\hat{\phi}, \ldots Y2[N{-}1]{-}\hat{\phi}).$$

The composite wideband signal in the frequency domain becomes (Y1, Y'2) where Y'2 refers to the received signal Y2 but with a corrected phase, i.e. Y'2 refers to a phase compensated version of the received signal Y2.

The time-domain version of the phase compensated composite wideband signal (Y1, Y'2) can then be used for TOA estimation. In this regard, the time-domain version of the phase compensated composite wideband signal (Y1, Y'2) can be correlated against the composite wideband signal (X1, X2).

The above calculation of the estimated phase offset assumes that Y1 and Y2 are received substantially simultaneously, i.e. at the same time instances.

If Y1 and Y2 were received at different time instances, then a further adjustment needs to be made to the phase of the received signals to compensate for a phase shift between the two received signals due the differing time instances of receipt (such a phase shift adjustment would need to be applied prior to applying the above discussed adjustment to compensate for the random phase offset).

Let us consider the receiver estimates the two channels at different time instants T1 and T2. Let us denote this time difference by $\Delta T=T2{-}T1$. The time difference causes a phase shift $\exp(-j*2*pi\Delta T/Ts*k/N)$ at subcarrier k OFDM symbol Y2 with regards to Y1, where 1/Ts refers to the sampling frequency and N to the number of subcarriers.

This phase shift should be compensated in Y2 before compensating the phase offset as described above. This phase shift can be calculated because the first apparatus' receiver is able to know the time difference between the receive times of the two OFDM symbols.

In practice, channel estimates are noisy. One option to improve the phase offset estimate is to average several phase differences in the received signals, Y1 and Y2. Let us denote a mean of an angle differences by d1 and d2 on both sides of the phase discontinuity as $$d_1 = \frac{1}{M} \sum_{i=0}^{M-1} \arg(Y1[N-i]X1^*[N-i]) - \arg(Y1[N-i-1]X1^*[N-i-1])$$

$$d_2 = \frac{1}{M} \sum_{i=1}^{M} \arg(Y2[i]X2^*[i]) - \arg(Y2[i-1]X2^*[i-1])$$

where M is a window size.

Then, the phase offset can be estimated, for example, from:

$$(d1+d2)/2+\hat{}\alpha = \arg(Y2[0]/X2[0]) - \arg(Y1[N-1]/X1[N-1])$$

At 306, the phase offset between the received RS1 and RS2 are compensated for, i.e. by adjusting the received RS1 and/or RS2 to take into account the phase offset. The phase shift could also be compensated for by adjusting the received RS1 and/or RS2 to take into account the phase shift, i.e. by adjusting a phase of the received signal components of the received RS1 and/or RS2.

Advantageously, examples of the present disclosure do not require or rely on separate/specific additional two-way signaling between the first apparatus and the second apparatus in the determination and compensation of the phase offsets of 305 and 306. Since, such signaling is not required, signaling overhead can be reduced.

At 307, the duly compensated/adjusted received RS1 and RS2 are combined/aggregated, e.g. to create a third RS-RS3, wherein RS3 has a wider bandwidth than each of RS1 and RS2. For example, phase offset adjusted narrowband PRS1 and PRS2 are aggregated to form a wideband PRS. In this regard the RS3 is generated based, at least in part, on the phase offset (i.e. to compensate for the phase offset due to the first apparatus's narrowband receiver tuning to a new centre frequency band to receive RS2) and it may also be generated based, at least in part, on the phase shift (i.e. to compensate for the phase shift due to the due the differing time instances of receipt of RS1 and RS2).

At 308, the combined compensated received RS1 and RS2, i.e. RS3, is used to determine positioning information. In this regard, measurements may be performed on the combined compensated received RS1 and RS2, i.e. RS3, such as correlate the combined compensated received RS1 and RS2 against a known sequence, wherein the known sequence in this case corresponds to an aggregation of the initial RS1 and RS2.

At 309, the positioning information is sent from the first apparatus to the second apparatus. In some examples, the positioning information comprises such measurement/correlation results, which may be reported to the second apparatus and/or forwarded on to another RAN node (such as a LS/LMF) to use the same to determine a position of the UE relative to the second apparatus; or (based on further position information such as a known location of the second apparatus) an absolute position of the UE. In other examples, the first apparatus determines for itself its relative or absolute position and sends the same to the second apparatus.

The first apparatus may comprise one or more of:
a wideband digital baseband;
a receiving means having a wide bandwidth in a digital domain thereof;
an analog receiver having a narrow bandwidth;
a receiving means having a narrow bandwidth in an analog domain thereof;
a narrowband RF front end; and
a narrowband RF chain.

The first apparatus may be comprised in a device. The device may be at least one selected from the group of: a portable device, a handheld device, a wearable device, a wireless communications device, a User Equipment, a positioning tag, or a server.

The second apparatus may be at least one of:
a RAN node;
a Location Server, LS;
a Location Management Function, LMF;
an access node;
a core node;
a relay node; and
another UE, such as a sidelink UE.

Advantageously, examples of the disclosure may provide a method to improve positioning accuracy in case where a receiving device/UE has a narrowband RF chain (i.e. a receiver having a narrow bandwidth in the RF/analogue domain) but a wideband digital baseband (i.e. the receiver has a wide bandwidth in the digital domain). This is achieved by constructing a wideband signal for positioning by coherently combining two or more narrowband signals. Each narrowband signal arrives at a different time and phase than other signals, resulting in a phase difference between the first signal and the others.

Coherent combining brings each narrow band signal into phase alignment before combining into wideband signal, thus allowing better time resolution for the positioning estimate using wideband signal.

Figure 4:
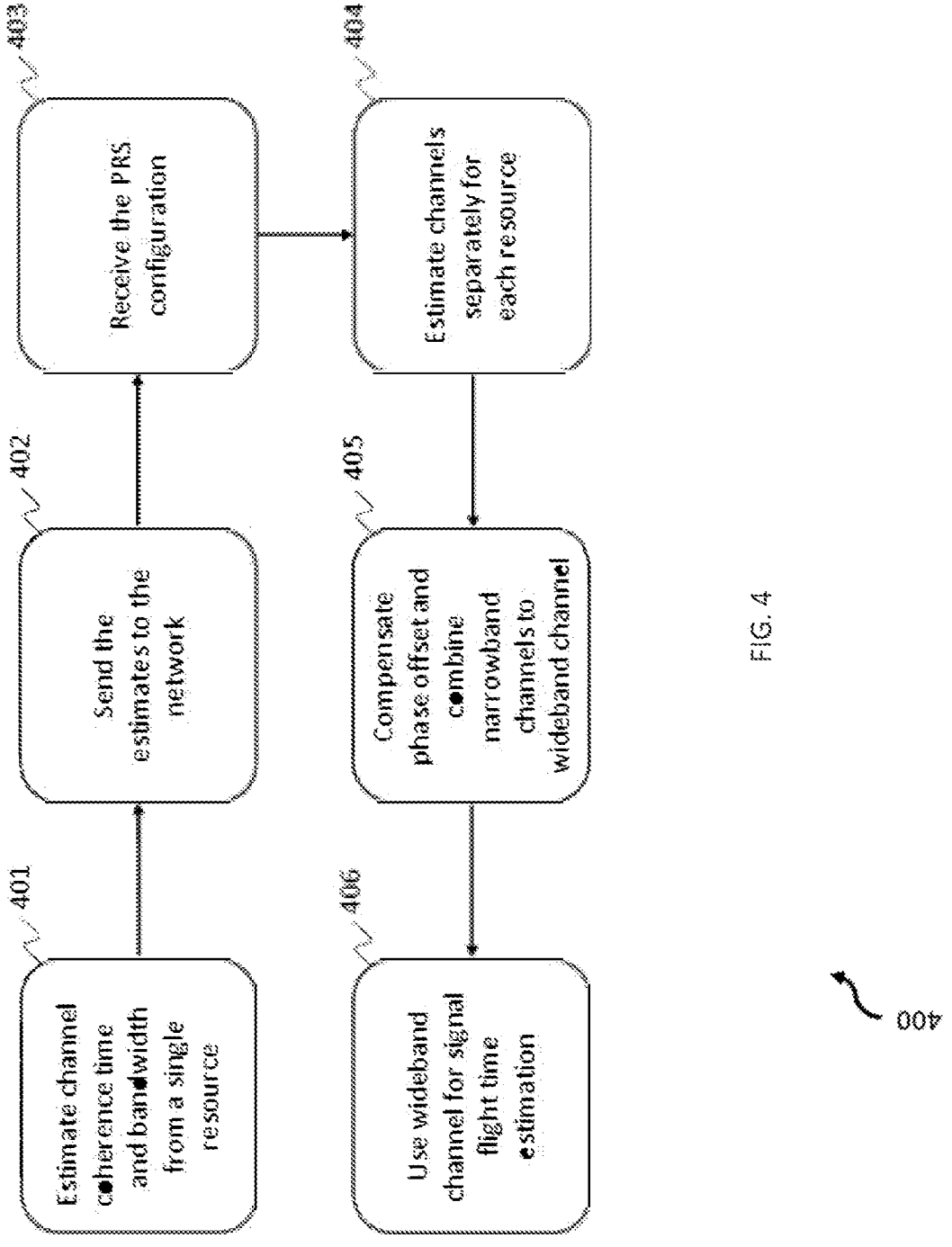
FIG. 4 shows another example of the subject matter described herein.

FIG. 4 schematically illustrates a flow chart of an example of a method 400. FIG. 4 can be considered to illustrate a plurality of methods, i.e. one or more actions by/at a plurality of actors/entities.

In block 401, UE estimates a coherence time and coherence bandwidth/frequency for a channel between the UE and a TRP. Such channel coherence information may be estimated by the UE from a DMRS received from the TRP. In this example, it is assumed that, initially, the UE is allocated one time-frequency resource, for example a bandwidth part, BWP, or component carrier (CC) that matches to the bandwidth of an RF chain of the UE's receiver (i.e. that matches the bandwidth of the analogue domain of the UE's receiver).

In some examples, the UE may have a narrowband RF chain but a wideband digital baseband.

The UE may estimate a channel coherence time from the DMRS, for instance by way of example 1-4 DMRS symbols in one frame. In general, the coherence time is reciprocal of Doppler shift, e.g. $9/(16\pi^*fd)$, where fd refers to the Doppler shift.

The UE may also estimate a channel coherence bandwidth from the DMRS, i.e. as a reciprocal of a delay spread of the DMRS. The estimate may be limited by the RF bandwidth.

There are different definitions for channel coherence bandwidth. The most common definition is a frequency range where a correlation between amplitudes on band edges is 0.5. Here, a coherence bandwidth refers to a correlation between phases instead of amplitudes. For an exponential channel delay profile, a coherence bandwidth based on a correlation of 0.5. between the phases is half of the coherence bandwidth of a 0.5. amplitude correlation. Thus, the two definitions for the coherence bandwidth are not the same but are similar/related.

In block 402, the UE sends the channel coherence estimates to the network together with device capability information. The device capability information may comprise information indicative of the UE's receiver's capabilities, such as the bandwidth of its RF chain (i.e. the bandwidth of the receiver's analogue domain) and the bandwidth of its digital baseband (i.e. the bandwidth of the receiver's digital domain), which can be used by the network in deciding whether it is worth attempting to effect wideband positioning via narrowband PRSs and, if so, determining the configuration and characteristics of PRSs and the allocation of resource for the same. In this regard, the network can use the received information to decide whether or not to allocate at least one new PRS.

If the network makes the decision to allocate at least one new PRS, referred to as PRS2 (in order to seek to effect wideband positioning via narrowband PRS and enable the UE to continue the procedure to coherently combine narrowband signals into a wideband signal), the network uses the reported coherence time and frequency information and allocates PRS2 into a time and frequency resource in accordance with the following coherence constraints. PRS2 is allocated into a time and frequency resource such that PRS2 and PRS1 are located within channel coherence time (i.e. the time resource for PRS2 and the time resource for PRS1 are within a channel coherence time from one another). The frequency resource of PRS2 is allocated such that (assuming that PRS2 is on a higher frequency than PRS1) the end frequency of PRS1 and the starting frequency of PRS2 are within the channel coherence bandwidth. Where PRS2 is on lower frequency than PRS1, the frequency resource of PRS2 is allocated such that the start frequency of PRS2 and the end frequency of PRS2 are within the channel coherence bandwidth. PRS1 and PRS2 may or may not overlap in frequency. In some examples, the last subcarrier of PRS1 and the first subcarrier of PRS2 are adjacent (this may provide a higher the bandwidth for a resultant composite wideband signal formed from PRS1 and PRS2, and thereby enable a better resolution and more accurate positioning to be achieved via a wideband positioning procedure such as performed in block 406).

If the network were to decide not to send a new PRS, nor allocate resources for the same within the above-mentioned channel coherence constraints, then the UE could continue using a conventional positioning.

Instead of the UE estimating a channel coherence time and signaling the same to the network, the UE may signal an estimated Doppler frequency to the network.

Instead of the UE estimating the channel coherence time and bandwidth, and signaling the same to the network, a gNB can estimate a channel coherence time and bandwidth from a uplink transmission from the UE. The network may use the gNB's estimates instead of the estimates signalled by the UE.

In block 403, the UE receives PRS configuration from the network.

If the network were able to find and allocate a time-frequency resource for the new PRS2 within the estimated coherence time and bandwidth, the UE would be able to proceed to construct, in effect, a composite wideband channel from two narrowband channels, i.e. construct a composite wideband PRS from narrowband PRS1 and narrowband PRS2.

If the network were not able to find suitable time-frequency resources such that PRS1 and PRS2 are outside of the estimated coherence time and/or coherence bandwidth, then there are at least the following options:

a. Network sends PRS1 and PRS2 in two resources (that do not abide by the above-mentioned coherence constraints) and UE combines the two narrowband channel estimates incoherently without trying to compensate for the phase offset between PRS1 and PRS2.

b. Network sends PRS1 and PRS2 in two resources (that do not abide by the above-mentioned coherence constraints) and UE estimates and compensates phase offset and constructs a wideband channel even when it may not improve the positioning accuracy c. Network allocates only one resource, PRS1, and UE falls back to narrowband position estimation In block 404, assuming the network was able to find suitable time-frequency resources such that PRS1 and PRS2 are within the estimated coherence time and/or coherence bandwidth constraints, the UE estimates the channels separately for each resource. In this regard, the UE estimates the channel for the time-frequency resource allocated for PRS1, and the UE also estimates the channel for the time-frequency resource allocated for PRS2.

The UE can estimate the narrowband channels from PRS1 and PRS2, or from two different DMRS or other pilot sequences. This may happen simultaneously in case UE has two narrowband receivers, or sequentially within the channel coherence time if the UE has only one narrowband RF chain.

If the UE is already allocated more than one channel resource, the UE can combine the channel estimates without further signaling to the network In block 405, the UE determines a phase offset between the received PRS1 and PRS2 and compensates for the same (i.e. UE adjusts the received PRS1 and/or the PRS2 so as to take into account the phase offset between the two received signals, such phase offset being due to the receiver's oscillator tuning to different centre frequencies to receive each of PRS1 and PRS2. In this regard, the UE may correct the phase offset between the two channel estimates and combine the two narrowband signals into one wideband signal in the baseband, wherein the wideband signal contains PRS1 and PRS2.

In block 405, the UE also constructs the composite wideband signal by combining the narrowband channels to form a wideband channel.

In block 406, the UE uses the composite wideband signal (formed of a combination of the received PRS1 and PRS2 with a duly corrected phase offset). For example, the wideband signal in the time domain is correlated with a wideband time-domain signal obtained by combining PRS1 and PRS2 (i.e. combining the actual/initial PRS1 and PRS2 to be transmitted). The largest peak in the output of the correlator denotes a time of arrival.

It is noted that, in instances where the UE has one narrowband RF chain, if the allocation of PRS2 requires switching to a new BWP, there is a switching delay of the order of 1 ms and more. For example, at 3.5 GHz carrier frequency, 1 KHz corresponds to the speed 1e3*3e8/3.5e9 m/s~300 km/h. The channel coherence time is reciprocally related to the maximum Doppler shift, and therefore, the switching time to a new BWP would not prevent use of the presently described positioning method for typical use and reasonable UE/mobile speeds.

Figure 5:
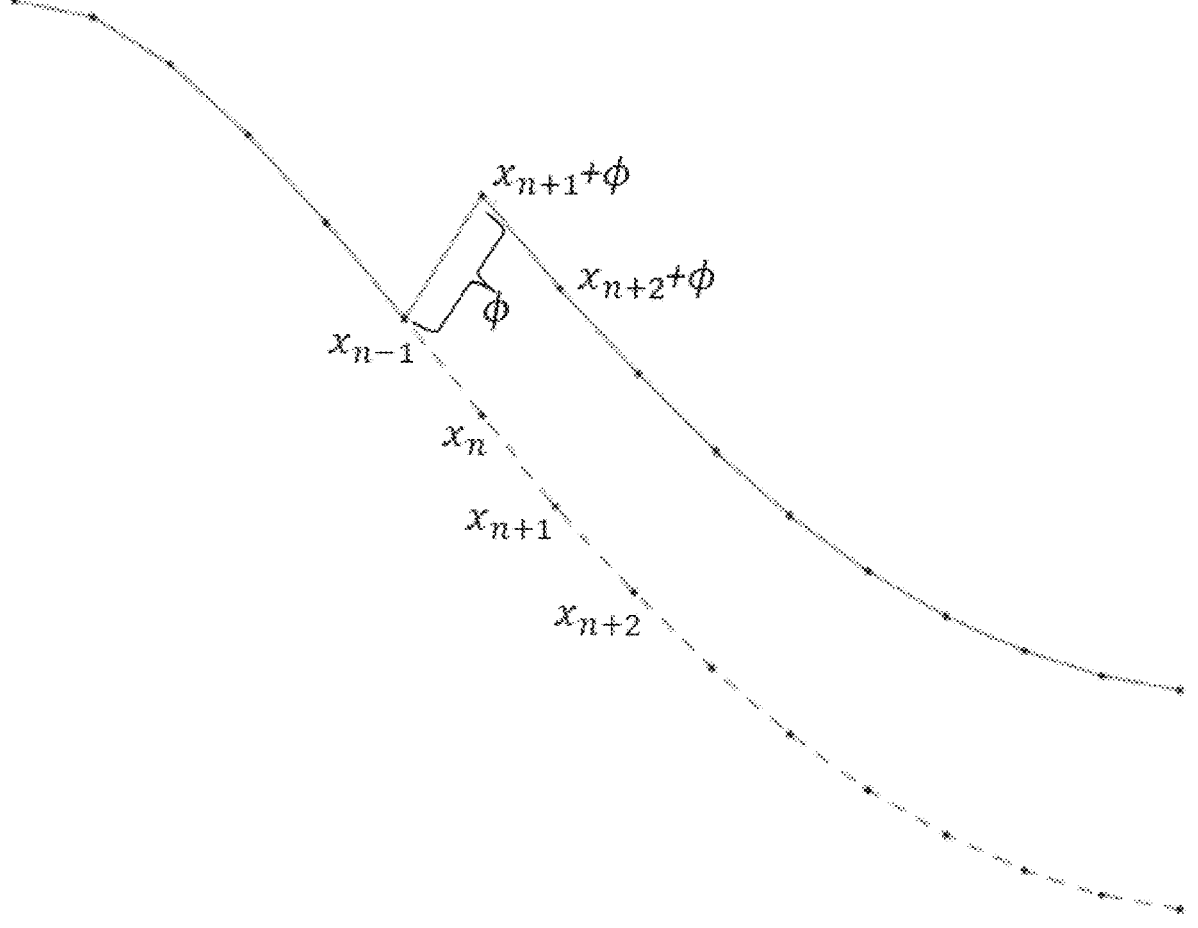
FIG. 5 shows another example of the subject matter described herein.

FIG. 5 schematically illustrates an estimation of a random phase offset between two narrowband channels One way to estimate the random phase offset is to match higher order numerical derivatives in addition to the first-order derivatives. As shown in FIG. 5, a step-wise change $ occurs between x[n]+x[n+1]. Let us define a first-order difference as:

$$D1(x[n])=x[n]-x[n-1].$$

Higher-order differences may be obtained by repeating D1. For example, a second-order difference is given by:

$$D2(x[n])=D1(D1(x[n]))=x[n]-2x[n-1]+x[n-2].$$

A step-wise change $\hat{\phi}_1$ can be estimated from the first-order differences as:

$$D1(x[n+1])+\hat{\phi}_1=D1(x[n]) \text{ or } \hat{\phi}_1=D1(x[n+1])+_1=D1$$
$$(x[n+2]).$$

An estimate $\hat{\phi}_2$, based on the second-order difference, can be found from:

$$D2(x[n+1])-2\hat{\phi}_2+\hat{\phi}_2=D2(x[n])+\hat{\phi}_2.$$

An estimate $\hat{\phi}_3$ based on a third-order difference can be found from:

$$D3(x[n+1])+\hat{\phi}_3=D3(x[n+2])+\hat{\phi}_3-3\hat{\phi}_3 \text{ and } so\ on.$$

The estimate can then be found as the weighted average:

$$\hat{\phi} = \sum_{i=1}^{K} w_i \hat{\phi}_i, \sum_{i=1}^{K} w_i = 1$$

where K is the maximum order of the differences

Figure 6:
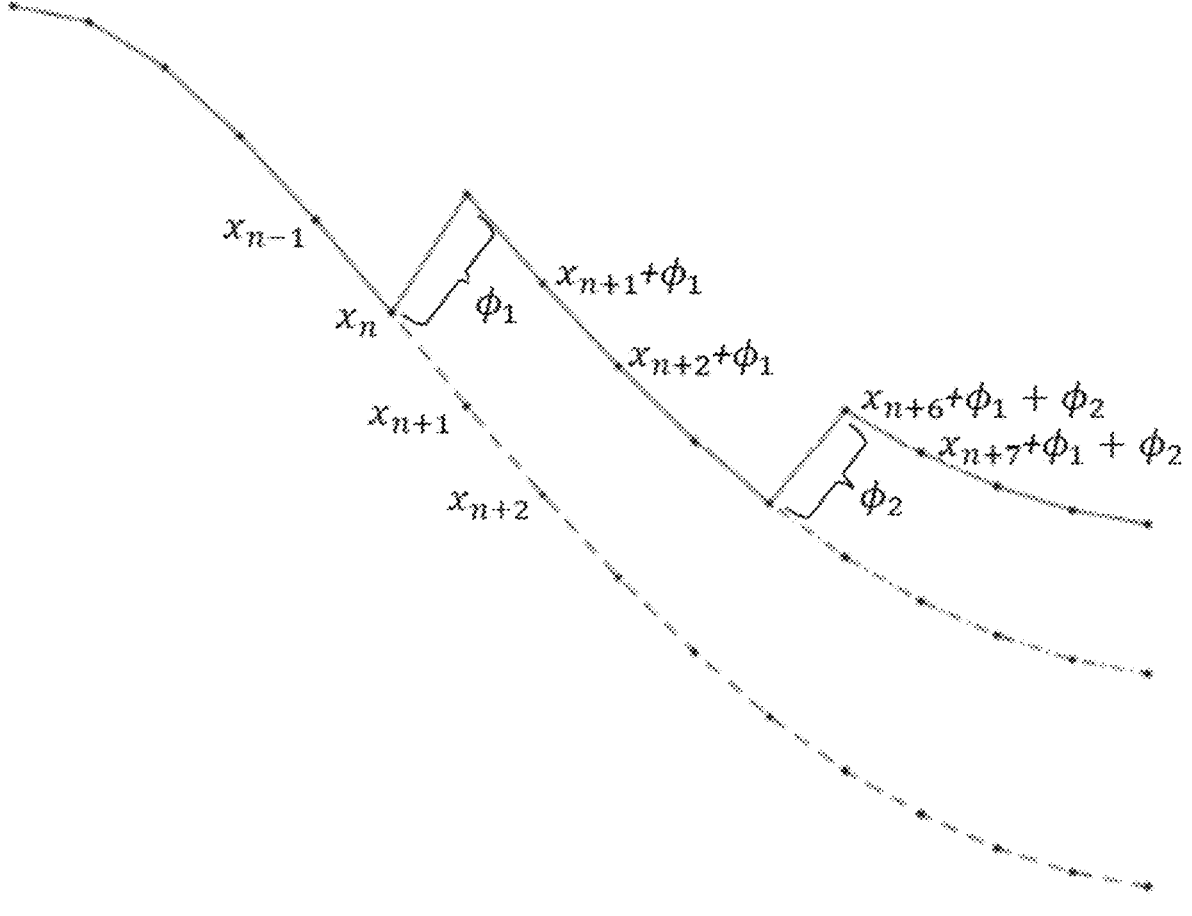
FIG. 6 shows another example of the subject matter described herein.

FIG. 6 schematically illustrates an estimation of a random phase offset between multiple narrowband channels.

There can be more than two sequences and time-frequency resources. FIG. 6 shows two step-wise changes $\phi 1$ and $\phi 2$ between x[0] and x[1], and between x[n] and x[n+1], respectively. The changes can be estimated separately, since D1(x[n])=D1(x[n]+$\phi$1). In case the samples around x[0] are uncorrelated with the samples around x[n] (for example, frequency bins x[0] and x[n] are not within channel coherence frequency) the estimates are uncorrelated as well.

Instead of constructing a wideband signal (Y1, Y'2), time of arrival estimation can directly use a composite channel H[0], . . . H[2N−1] where the phase offset in the N largest subcarriers has been corrected.

If the wideband signal is constructed of narrowband signals received at different times (within the channel coherence time), a receiver window should remain fixed. That is, a time window to receive one OFDM symbol and its cyclic prefix without inter-symbol interference.

In cases where frequency channel coherency becomes an issue, a relative phase difference can be estimated between Y1 and Y2. It is known that a RX side of a transmission does not know about absolute phase rotation from a relative phase delta estimation.

In one aspect of the disclosure, an accuracy of an estimation with respect to additive noise can be improved by increasing a size of a window used for the estimation. That is, using frequency bins: H[N-M], . . . , H[N−1] and H[N], . . . , [N+M-1] where M controls the size of the window. Here, M is not a limiting factor. Instead, the limiting factor is a frequency gap between H[N−1] and H[N], i.e. a difference between a highest frequency bin in Y1 and a lowest frequency bin in Y2.

M=1 can be used to estimate the phase offset. The phase offset is calculated between the phases of the two channel estimates. These phases are included in the channel estimates and used in a later detection. Absolute phase (i.e. a phase of the channel estimate) is needed for detection, while an estimation of a peak of the received signal (and consequently an estimation of the signal's flight time) requires only a magnitude of the phase.

Figure 7:
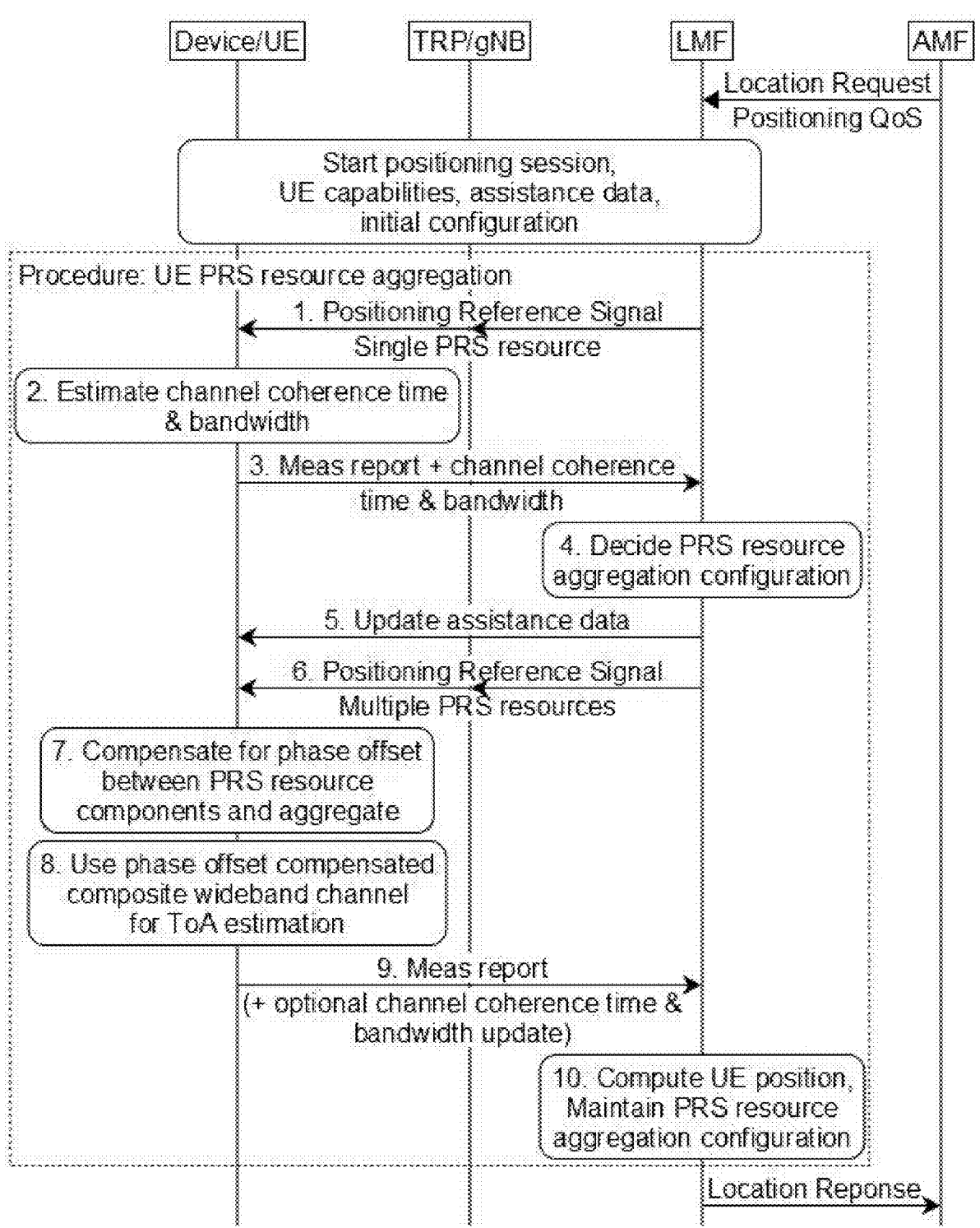
FIG. 7 shows another example of the subject matter described herein.

FIG. 7 is a signalling diagram illustrating signaling between: a device/UE (which can be equated to a first apparatus $10_1$ of FIG. 3), a TRP/gNB, an LMF (which can be equated to a second apparatus $10_2$ of FIG. 3) and an AMF. The signalling flow in this figure indicates a procedure to compensate for phase offset between component carriers, i.e. phase offset between PRS resource components.

FIG. 7 can be considered to illustrate a plurality of methods, i.e. one or more actions by/at a plurality of actors/entities. FIG. 7 can be considered to illustrate a plurality of individual methods performed by each respective individual actor/entity of the plurality of the actors/entities.

The AMF may send a Location Request and a Positioning Quality of Service, QoS, for the same to the LMF. A positioning session may thereby be started by the LMF, during which information relating to UE capabilities, assistance data and an initial configuration may be determined and signalled between the UE, TRT and LMF.

In the positioning session, a UE PRS resource aggregation procedure may be carried out.

In step 1 of this, the LMF sends to the UE, via the gNB, a Positioning Reference Signal, which is transmitted via a single PRS resource allocated to the PRS. (This step corresponds to 301 of FIG. 3).

In step 2, the UE estimates a channel coherence time and bandwidth. The channel coherence time and bandwidth depend, at least in part, on a speed of movement of the UE as well as a trajectory of UE movement with respect to an angle between the UE and the gNB. In some examples, the UE estimates a channel coherence time from all gNBs (e.g. both serving and non-serving/neighbouring gNBs) and the UE selects a minimum of these estimates to represent the channel coherence time. For simplicity, the coherence time may be estimated only from a channel estimate between the UE and a serving gNB. Assuming that a UE's direction of movement is somewhat random and time-varying, the coherence time estimates from different gNBs will converge over time. (This step corresponds to 302 of FIG. 3).

In step 3, the UE sends to the LMF, via the gNB, a measurement report comprising the channel coherence time and bandwidth estimates. (This step corresponds to 303 of FIG. 3).

In step 4, the LMF decides PRS resource aggregation configuration. In effect, the LMF configures the allocation of multiple resources for sending a wideband PRS to the UE. In this regard, the LMF allocates multiple resources for sending respective multiple narrowband PRSs that are to be send to the UE (for the UE to aggregate the same into a wideband PRS). The resources are allocated such that they abide by the channel coherence conditions as discussed above. (This step corresponds to 304 of FIG. 3).

In step 5, the LMF sends to the UE, via the gNB, update assistance information to the UE which comprises configuration information for configuring the UE to receive the wideband PRS via multiple narrowband PRSs via the multiple allocated resources. (This step corresponds to 201 of FIGS. 1 and 3).

In step 6, the LMF sends to the UE, via the gNB, the (wideband) PRS via the allocated multiple resources. In effect, the LMF sends multiple narrowband PRS resources, via their respective allocated resources, to the UE (for the UE to aggregate the same into a wideband PRS). (This step corresponds to 202 of FIGS. 1 and 3).

In step 7, the UE compensates for phase offset between the narrowband PRS phase components (i.e. determines a phase offset between the narrowband PRS phase components PRS1 and PRS1) and aggregates the phase offset compensated PRS narrowband phase components to form a composite wideband PRS. (This step corresponds to 305-307 of FIG. 3).

In step 8, the UE uses the aggregated phase offset compensated PRS narrowband phase components to perform a Time Of Arrival estimation. (This step corresponds to 308 of FIG. 3). In this regard, the UE may perform at least one measurement on the generated composite wideband PRS.

In step 9, the UE sends, via the gNB, to the LMF, a measurement report. (This step corresponds to 309 of FIG. 3). In this regard, the UE may send a measurement result of the at least one measurement performed on the generated composite wideband PRS. The UE may also optionally update its estimate of channel coherence time and bandwidth based on the PRS received in step 6 and send an update of the channel coherence time and bandwidth, which can be used to repeat steps 4 to 9 and update the PRS resource aggregation configuration.

In step 10, the LMF computes a position of the device based, at least in part on the received measurement report. The LMF may maintain the PRS resource aggregation configuration.

It is to be appreciated that the steps between 2 and 4 could be repeated to monitor coherence time and bandwidth changes and further adapt the aggregated PRS resources according to observed changes with steps 5. and 6. In this regard, the LMF can maintain and/or update the PRS resource aggregation configuration after the step 9.

Examples of the disclosure provide a practical method to increase a bandwidth of a reference signal, wherein the reference signal is formed by combining multiple aggregated resources and receiving components of the reference signal via such resources.

Figure 8:
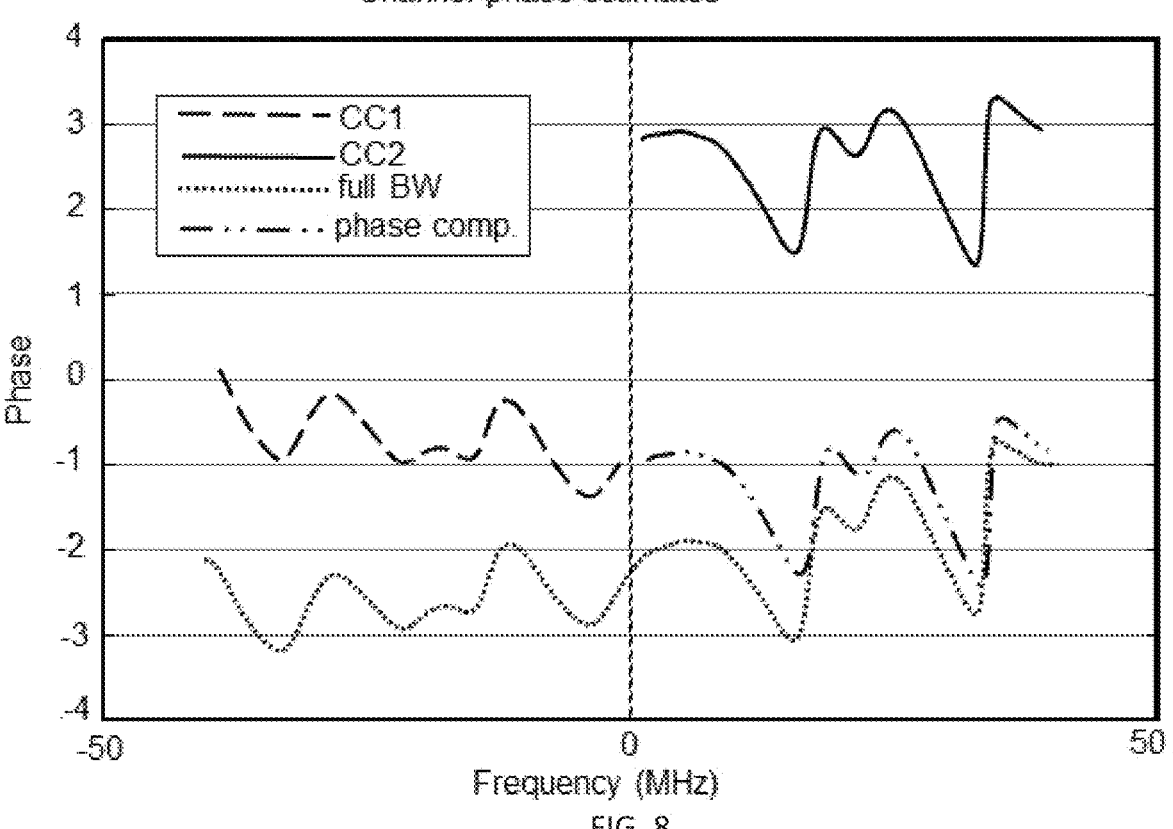
FIG. 8 shows another example of the subject matter described herein.

It is appreciated that, by default, carriers in FR2 frequency bands are wideband, e.g. more than 100 MHz. Accordingly, such carriers in FR2 frequency bands may already provide a sufficient accuracy for positioning. In which case, the method to construct a composite wideband signal from plural narrowband signals as described in the present disclosure may not be needed in FR2 frequency bands. Accordingly, it is considered that a primary use case of examples of the present disclosure would apply to deployments in FR1. However, use cases in FR2 are not excluded, for instance if very wideband carriers are needed (e.g. constructing a composite ultra-wideband signal from plural wideband signals). FIG. 8 illustrates an example of phase offset between two narrowband component carriers: "CC1" and "CC2" (i.e. over which first and second narrowband RSs, e.g. PRS1 and PRS2, may be transmitted/received). The "CC1" and "CC2" curves show phase responses of two component carriers CC1 and CC2. The "full BW" curve shows the phase response of a corresponding known wideband channel. The "phase comp" curve shows the phase response of CC2 following compensation of its phase offset between CC1 and CC2 (i.e. wherein CC2's phase response have been corrected to match the phase of CC1 at the frequency gap between CC1 and CC2).

It is seen that compensating the frequency offset between CC1 and CC2 facilitates the use of a composite wideband channel, composed from CC1 and the phase offset corrected CC2. Such a composite wideband channel can be used for TOA estimation. A phase response of the composite wideband channel is shown via a combination of the "CC1" and "phase comp" curves.

There is a frequency gap between CC1 and CC2. The common phase of CC1 and the compensated CC2 is different from the yellow wideband channel. However, the common phase is irrelevant for positioning, because the estimation of time-of-arrival is based on the magnitude of the cross correlation between a received signal and a reference signal.

The phase response of the "full BW" is based on a known channel, while the phase responses of CC1 and CC2 are based on channel estimation (e.g. estimation of the channels defined by the resources allocated to the narrowband PRS components, PRS1 and PRS2, that are to be aggregated to a wideband PRS). It is seen that the phase offset between CC1 and CC2 can be estimated and compensated making it possible to coherently combine CC1 and CC2 into one composite wideband channel, and using this composite wideband channel to receive a composite wideband PRS (formed by an aggregation of the received PRS1 and PRS2) for position estimation.

Figure 9:
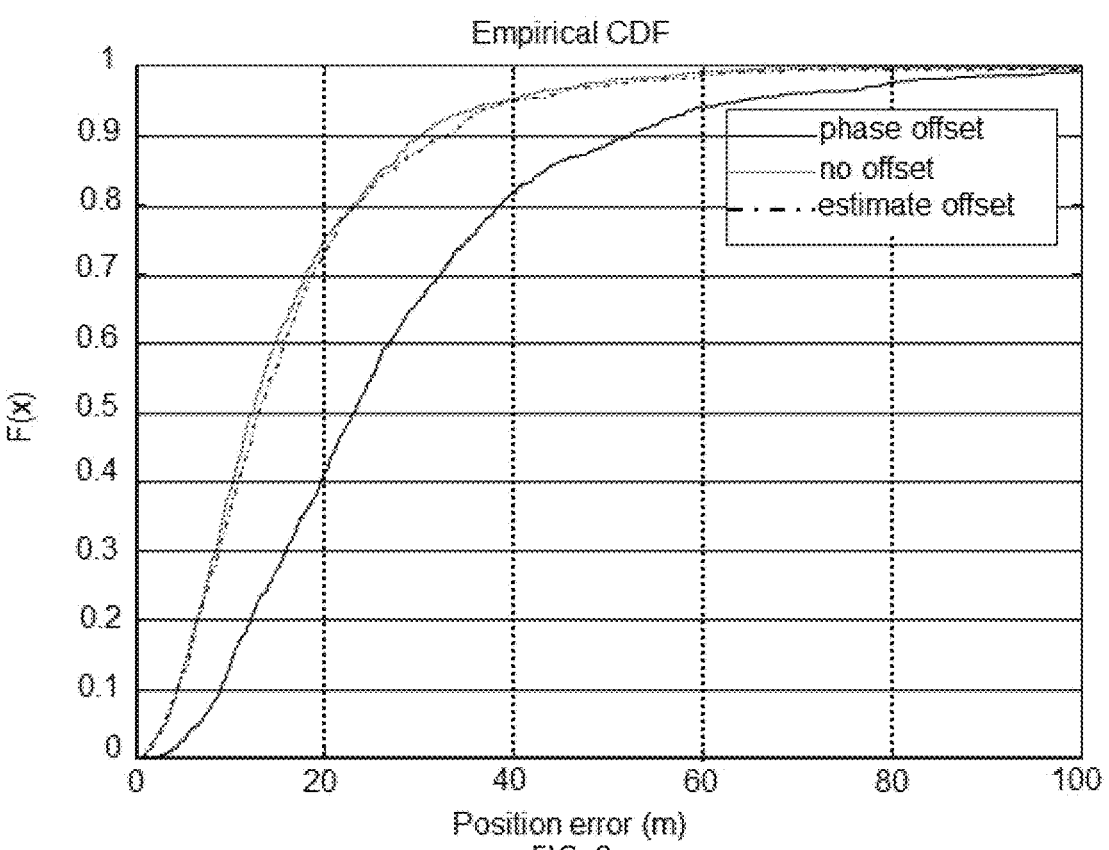
FIG. 9 shows another example of the subject matter described herein.

FIG. 9 illustrates a simulated empirical Cumulative Distribution Function (CDF) of a position error estimate for an observed time difference of arrival (OTDOA) method based on wideband PRSs received from five base stations. The received wideband signal is composed of two received narrowband signals. The bandwidth of the wideband signal is twice the bandwidth of the narrowband signals. In the simulation, base stations are randomly located in each iteration while the UE stays in the origin. Position estimation is based on a correlation with PRS over the wideband signal.

The "no offset" curve depicts the CDF of the position error using a wideband signal whose bandwidth is twice the narrowband signal, i.e. wherein there is no phase offset between the narrowband signals.

The "phase offset" curve shows the CDF when the random offset phase between the two narrowband channels/narrowband signals is not compensated, i.e. such that there is a random phase offset between the two signals. It is seen that the random phase offset deteriorates the performance significantly. This corresponds to using two narrowband channels for TOA estimation giving only diversity gain when compared to the estimation using one narrowband channel.

The "estimate offset" curve depicts the CDF when the random phase offset between the narrowband signals is estimated from the noisy received signals before composing the wideband signal from the two narrowband signals, and the resulting composite wideband signal is used for position estimation. The estimation uses a wideband signal whose bandwidth is twice the narrowband signal. It is clear from the "estimate offset" curve the effect that estimating and correcting the phase offset has in positioning accuracy.

The blocks illustrated in FIGS. 2, 3 4 and 7 can represent actions in a method, functionality performed by an apparatus, and/or sections of instructions/code in a computer program.

It will be understood that each block and combinations of blocks illustrated in FIGS. 3 4 and 7 as well as the further functions described above, can be implemented by various means, such as hardware, firmware, and/or software including one or more computer program instructions. For example, one or more of the functions described below can be performed by a duly configured apparatus (such as an apparatus, or UE, comprising means for performing the below described functions). One or more of the functions described above can be embodied by a duly configured computer program (such as a computer program comprising computer program instructions which embody the functions described below and which can be stored by a memory storage device and performed by a processor).

As will be appreciated, any such computer program instructions can be loaded onto a computer or other programmable apparatus (i.e. hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational block/steps/actions to be performed by the processor(s) to produce a computer implemented process such that the instructions which execute on the processor(s) provide block/steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

FIG. 10 schematically illustrates a block diagram of an apparatus 10 for performing the methods, processes, procedures and signalling described in the present disclosure and illustrated in FIGS. 3 4 and 7, in this regard the apparatus can perform the roles of a UE 110, a RAN node 120, or a LMF 140 in the illustrated and described methods.

The apparatus comprises a controller 11, which could be provided within a device such as a UE 110, a RAN node 120, or a LMF 140.

The controller 11 can be embodied by a computing device, not least such as those mentioned above. In some, but not necessarily all examples, the apparatus can be embodied as a chip, chip set, circuitry or module, i.e. for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, sensors, input/output user interface elements and/or other modules/devices/components for inputting and outputting data/commands).

The memory 13 stores a computer program 14 comprising instructions (computer program instructions/code) that controls the operation of the apparatus 10 when loaded into the processor 12. The instructions of the computer program 14, provide the logic and routines that enables the apparatus to perform the methods, processes and procedures described in the present disclosure and illustrated in FIGS. 3, 4 and 7. The processor 12 by reading the memory 13 is able to load and execute the computer program 14.

The computer program instructions may be comprised in a computer program, a non-transitory computer readable medium, a computer program product, a machine-readable medium. The term "non-transitory," as used herein, is a limitation of the medium itself (i.e. tangible, not a signal) as opposed to a limitation on data storage persistency (e.g. RAM vs. ROM). In some but not necessarily all examples, the computer program instructions may be distributed over more than one computer program.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and illustrated in FIGS. 3 4 and 7. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set, circuitry or module, i.e. for use in any of the foregoing.

In one example, the apparatus is embodied on a hand held portable electronic device, such as a mobile telephone, mobile communication device, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions, or any combination thereof.

In examples where the apparatus is provided within a UE 110, the apparatus comprises:

at least one processor 12; and at least one memory 13 storing instructions that, when executed by the at least one processor 12, cause the apparatus at least to:

receive configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receive, based at least in part on the configuration information, the first and second RSs;

determine a phase offset between the received first RS and the received second RS;

adjust one of the first and second received RSs based, at least in part, on the phase offset;

generate a third RS for use in position estimation, wherein the third RS is generated based, at least in part, on:

one of the first and second RSs, and an adjusted other of the first and second RSs.

In examples where the apparatus is provided within a RAN node 120, not least such as for example an LMF 140, the apparatus comprises:

at least one processor 12; and at least one memory 13 storing instruction that, when executed by the at least one processor 12, cause the apparatus at least to:

send configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

send, based at least in part on the configuration information, the first and second RSs.

According to some examples of the present disclosure, there is provided a system (for example at least one UE 110 and a RAN node 120).

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

Figure 11:
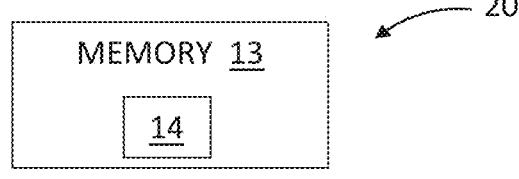
FIG. 11 shows another example of the subject matter described herein.

FIG. 11, illustrates a computer program 14 which may be conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. An apparatus can receive, propagate or transmit the computer program as a computer data signal.

In certain examples of the present disclosure, there is provided a computer program comprising instructions, which when executed by an apparatus (e.g. UE 110), cause the apparatus to perform at least the following or for causing performing at least the following:

receiving configuration information for configuring the apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

receiving, based at least in part on the configuration information, the first and second RSs;

determining a phase offset between the received first RS and the received second RS;

adjusting one of the first and second received RSs based, at least in part, on the phase offset;

generating a third RS for use in position estimation, wherein the third RS is generated based, at least in part, on:

one of the first and second RSs, and an adjusted other of the first and second RSs.

In certain examples of the present disclosure, there is provided computer program comprising instructions, which when executed by an apparatus (e.g. RAN node 120 not least such as for example an LMF 140), cause the apparatus to perform at least the following or for causing performing at least the following:

determine/generate configuration information for configuring a second apparatus to receive a first Reference Signal, RS, and a second RS, wherein the configuration information comprises information indicative of:

a first time-frequency resource allocated to the first RS, and a second time-frequency resource allocated to the second RS;

wherein the allocation of at least one of the first or second time-frequency resources is based, at least in part, on:

an estimate of a coherence time of a channel between the apparatus and a node of a Radio Access Network, RAN, and an estimate of a coherence bandwidth of the channel;

sending the configuration information;

sending, based at least in part on the configuration information, the first and second RSs.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not.

Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims. For example, whilst various examples have been described with respect to first and second RSs, and first and second narrowband channels, it is to be appreciated that the teaching of the present disclosure could be extended to two or more RSs or narrowband channels. Whilst various examples have been described with respect to the RSs being PRSs, it is to be appreciated that the teaching of the present disclosure could be extended to other types of RS, including uplink RS not least such as SRSs. Whilst various examples have been described with respect to performing wideband position estimation from narrowband signals, it is to be appreciated that the teaching of the present disclosure could be extended to performing wideband digital signal processing based on narrowband analogue signals, and/or forming a composite wideband channel from a plurality of narrowband channels.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect' and 'communication' and their derivatives mean operationally connected/in communication. It should be appreciated that any number or combination of intervening components can exist (including no intervening components), i.e. so as to provide direct or indirect connection/communication (e.g. direct or indirect sending/transmission/receiving). Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), retrieving/accessing (for example, retrieving/accessing data in a memory), obtaining and the like. Also, "determine/determining" can include resolving, selecting, choosing, establishing, and the like.

References to a parameter (for example an estimate of a channel coherence time/bandwidth of a channel between the apparatus and a node), or value of a parameter, should be understood to refer to "data indicative of", "data defining" or "data representative of" the relevant parameter/parameter value if not explicitly stated (unless the context demands otherwise). The data may be in any way indicative of the relevant parameter/parameter value, and may be directly or indirectly indicative thereof.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are used with an inclusive not an exclusive meaning and are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, block, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

What is claimed is:

1. An apparatus comprising:
at least one processor; and
at least one memory storing instructions that, when executed by the at least one processor, cause the apparatus at least to:
receive configuration information for configuring the apparatus to receive a first Reference Signal (RS) and a second RS, wherein the configuration information comprises information indicative of:
a first time-frequency resource allocated to the first RS, and
a second time-frequency resource allocated to the second RS,
wherein an allocation of at least one of the first or second time-frequency resources is based, at least in part, on:
an estimate of a coherence time of a channel between the apparatus and a node of a Radio Access Network, and
an estimate of a coherence bandwidth of the channel;
receive, based at least in part on the configuration information, the first and second RSs;
determine a phase offset between the received first RS and the received second RS;
adjust a phase of at least one of the first and second received RSs based, at least in part, on the phase offset; and
generate a third RS for use in position estimation, wherein the apparatus generates the third RS based, at least in part, on:
one of the first and second RSs, and
an adjusted other of the first and second RSs.

2. The apparatus of claim 1, wherein a separation distance, in a time domain, between the first time-frequency resource and the second time-frequency resource is less than or equal to the estimate of the coherence time.

3. The apparatus of claim 1, wherein the configuration information configures the apparatus to receive the first and second RSs within a period of time that is less than or equal to the estimate of the coherence time.

4. The apparatus of claim 1, wherein a separation distance, in a frequency domain, between:
a frequency within one of the first and second time-frequency resources, and
a frequency within the other of the first and second time-frequency resources is less than or equal to the estimate of the coherence bandwidth.

5. The apparatus of claim 1, wherein the configuration information configures the apparatus to receive the first and second RSs over respective first and second frequency ranges, and
wherein an upper end of one of the first and second frequency ranges and a lower end of the other of the first and second frequency ranges are within a frequency bandwidth that is less than or equal to the estimate of the coherence bandwidth.

6. The apparatus of claim 1, wherein each of the received first RS and the received second RS comprises, in a frequency domain, a plurality of signal components associated with a respective plurality of frequencies, and
wherein the instructions, when executed by the at least one processor, further cause the apparatus at least to:
select a first signal component of the first RS and a second signal component of the second RS whose respective associated frequencies are separated by less than or equal to the estimate of the coherence bandwidth;
determine a first phase value for the first signal component;
determine a second phase value for the second signal component; and
define the phase offset based, at least in part, on a difference between the first and second phase values.

7. The apparatus of claim 1, wherein the instructions, when executed by the at least one processor, further cause the apparatus at least to:
determine a difference between a time of reception of the first RS and a time of reception of the second RS; and
determine a phase shift between the received first RS and the received second RS based, at least in part, on the difference in the time of the reception of the first RS and the time of the reception of the second RS.

8. The apparatus of claim 7, wherein adjusting the phase of the at least one of the first and second received RSs comprises adjusting the phase of the at least one of the first and second received RSs based, at least in part, on the phase shift.

9. The apparatus of claim 7, wherein generating the third RS is further based, at least in part, on the phase shift.

10. The apparatus of claim 1, wherein the first RS has a first bandwidth, and the second RS has a second bandwidth, and wherein the third RS has a third bandwidth greater than each of the first and second bandwidths.

11. The apparatus of claim 1, wherein the instructions, when executed by the at least one processor, further cause the apparatus at least to:

perform at least one measurement on the generated third RS; and send a measurement result of the at least one measurement performed on the generated third RS.

12. A method comprising:

receiving configuration information for configuring an apparatus to receive a first Reference Signal (RS) and a second RS, wherein the configuration information comprises information indicative of:

a first time-frequency resource allocated to the first RS, and a second time-frequency resource allocated to the second RS, wherein an allocation of at least one of the first or second time-frequency resources is based, at least in part, on:

an estimate of a coherence time of a channel between the apparatus and a node of a Radio Access Network, and an estimate of a coherence bandwidth of the channel;

receiving, based at least in part on the configuration information, the first and second RSs;

determining a phase offset between the received first RS and the received second RS;

adjusting a phase of at least one of the first and second received RSs based, at least in part, on the phase offset; and generating a third RS for use in position estimation, wherein the third RS is generated based, at least in part, on:

one of the first and second RSs, and an adjusted other of the first and second RSs.

13. The method of claim 12, wherein a separation distance, in a time domain, between the first time-frequency resource and the second time-frequency resource is less than or equal to the estimate of the coherence time.

14. The method of claim 12, wherein the configuration information configures the apparatus to receive the first and second RSs within a period of time that is less than or equal to the estimate of the coherence time.

15. The method of claim 12, wherein a separation distance, in a frequency domain, between:

a frequency within one of the first and second time-frequency resources, and a frequency within the other of the first and second time-frequency resources is less than or equal to the estimate of the coherence bandwidth.

16. The method of claim 12, wherein the configuration information configures the apparatus to receive the first and second RSs over respective first and second frequency ranges, and wherein an upper end of one of the first and second frequency ranges and a lower end of the other of the first and second frequency ranges are within a frequency bandwidth that is less than or equal to the estimate of the coherence bandwidth.

17. The method of claim 12, wherein each of the received first RS and the received second RS comprises, in a frequency domain, a plurality of signal components associated with a respective plurality of frequencies, and wherein the method further comprises:

selecting a first signal component of the first RS and a second signal component of the second RS whose respective associated frequencies are separated by less than or equal to the estimate of the coherence bandwidth;

determining a first phase value for the first signal component;

determining a second phase value for the second signal component; and defining the phase offset based, at least in part, on a difference between the first and second phase values.

18. The method of claim 12, further comprising:

determining a difference between a time of reception of the first RS and a time of reception of the second RS; and determining a phase shift between the received first RS and the received second RS based, at least in part, on the difference in the time of the reception of the first RS and the time of the reception of the second RS.

19. The method of claim 18, further comprising:

adjusting the phase of at least one of the first and second received RSs based, at least in part, on the phase shift.

20. A non-transitory computer program product comprising instructions, which when executed by an apparatus, cause the apparatus to perform:

receiving configuration information for configuring the apparatus to receive a first Reference Signal (RS) and a second RS, wherein the configuration information comprises information indicative of:

a first time-frequency resource allocated to the first RS, and a second time-frequency resource allocated to the second RS, wherein an allocation of at least one of the first or second time-frequency resources is based, at least in part, on:

an estimate of a coherence time of a channel between the apparatus and a node of a Radio Access Network, and an estimate of a coherence bandwidth of the channel;

receiving, based at least in part on the configuration information, the first and second RSs;

determining a phase offset between the received first RS and the received second RS;

adjusting a phase of at least one of the first and second received RSs based, at least in part, on the phase offset; and generating a third RS for use in position estimation, wherein the third RS is generated based, at least in part, on:

one of the first and second RSs, and an adjusted other of the first and second RSs.

* * * * *